(12) United States Patent
Daily et al.

(10) Patent No.: US 8,167,247 B2
(45) Date of Patent: May 1, 2012

(54) SPACE-BASED OCCULTER

(75) Inventors: Dean R. Daily, Torrance, CA (US);
David J. Rohweller, Ojai, CA (US);
Tiffany Glassman, Hawthorne, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 215 days.

(21) Appl. No.: 12/754,293

(22) Filed: Apr. 5, 2010

(65) Prior Publication Data

US 2011/0242663 A1    Oct. 6, 2011

(51) Int. Cl.
*B64G 1/22* (2006.01)

(52) U.S. Cl. .................. 244/172.6; 244/158.1; 359/613; 359/601

(58) Field of Classification Search ............... 244/172.6, 244/158.1; 359/613, 601, 234
See application file for complete search history.

(56) References Cited

U.S. PATENT DOCUMENTS

| | | | | |
|---|---|---|---|---|
| 4,030,102 | A * | 6/1977 | Kaplan et al. ............... | 343/915 |
| 5,315,795 | A   | 5/1994 | Chae et al. | |
| 5,815,261 | A * | 9/1998 | Brooks et al. ............... | 356/310 |
| 7,009,789 | B1 *| 3/2006 | Brown ......................... | 359/613 |
| 7,759,664 | B2 *| 7/2010 | Marks et al. ................ | 250/505.1 |
| 7,828,451 | B2 *| 11/2010 | Cash .......................... | 359/613 |
| 7,837,154 | B2 *| 11/2010 | Trabandt et al. ........... | 244/159.1 |
| 2008/0164428 | A1 | 7/2008 | Marks et al. | |
| 2008/0180802 | A1 | 7/2008 | Cash | |
| 2009/0153938 | A1*| 6/2009 | Arenberg et al. ........... | 359/234 |

OTHER PUBLICATIONS

Optimized vs. Hypergaussian Occulters. May 18, 2007. by Robert J. Vanderbei.*
Lillie et al.: "*Large Precision Deployables for Exo-Planet Missions*" Submitted to the ExoPlanet Task Force in Response to the Call for White Papers Apr. 2, 2007.
Cash et al.: "*The New Worlds Observer: Direct Study of Exo-planets Using External Occulters*" University of Colorado & the NASA Institute for Advanced Concepts, dated May 17, 2007.

* cited by examiner

*Primary Examiner* — Christopher P Ellis
(74) *Attorney, Agent, or Firm* — Tarolli, Sundheim, Covell & Tummino LLP

(57) ABSTRACT

A space-based occulter is selectively movable between stowed and deployed configurations. A base hub has a longitudinally oriented center axis. A plurality of petals are provided, each petal extending radially outward from, and spaced radially apart from, the base hub when in the deployed configuration. Each petal has a hypergaussian edge made up of a plurality of hypergaussian edge panels. Each hypergaussian edge panel defines a portion of the hypergaussian edge of the petal. Each hypergaussian edge panel is made substantially of a material having a near zero coefficient of thermal expansion. A circular central portion is located radially between the base hub and the plurality of petals. A covering skin extends laterally between the hypergaussian edges of each petal and over the circular central portion. The covering skin defines a substantially planar surface oriented substantially perpendicular to the center axis when the occulter is in the deployed configuration.

40 Claims, 14 Drawing Sheets

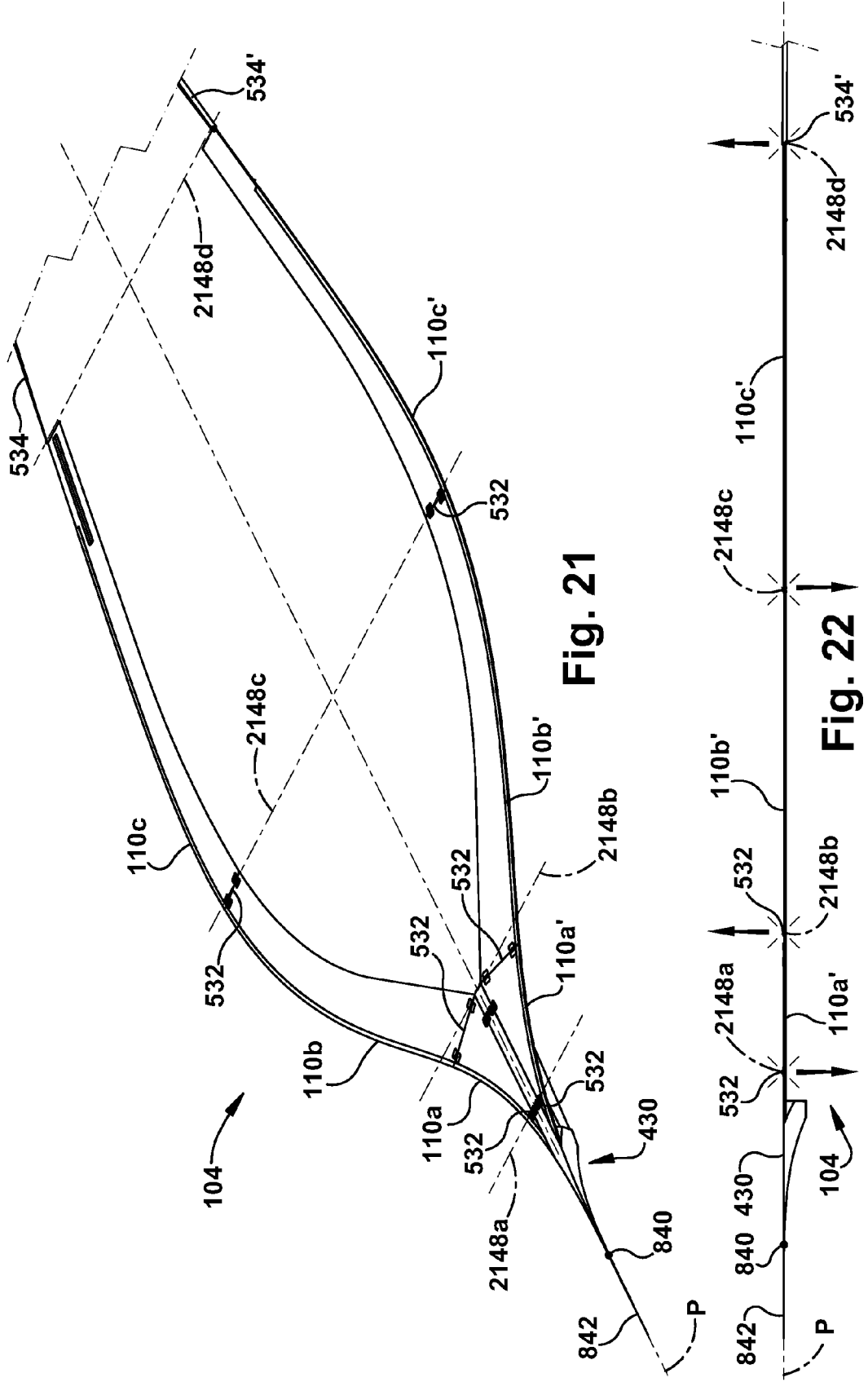

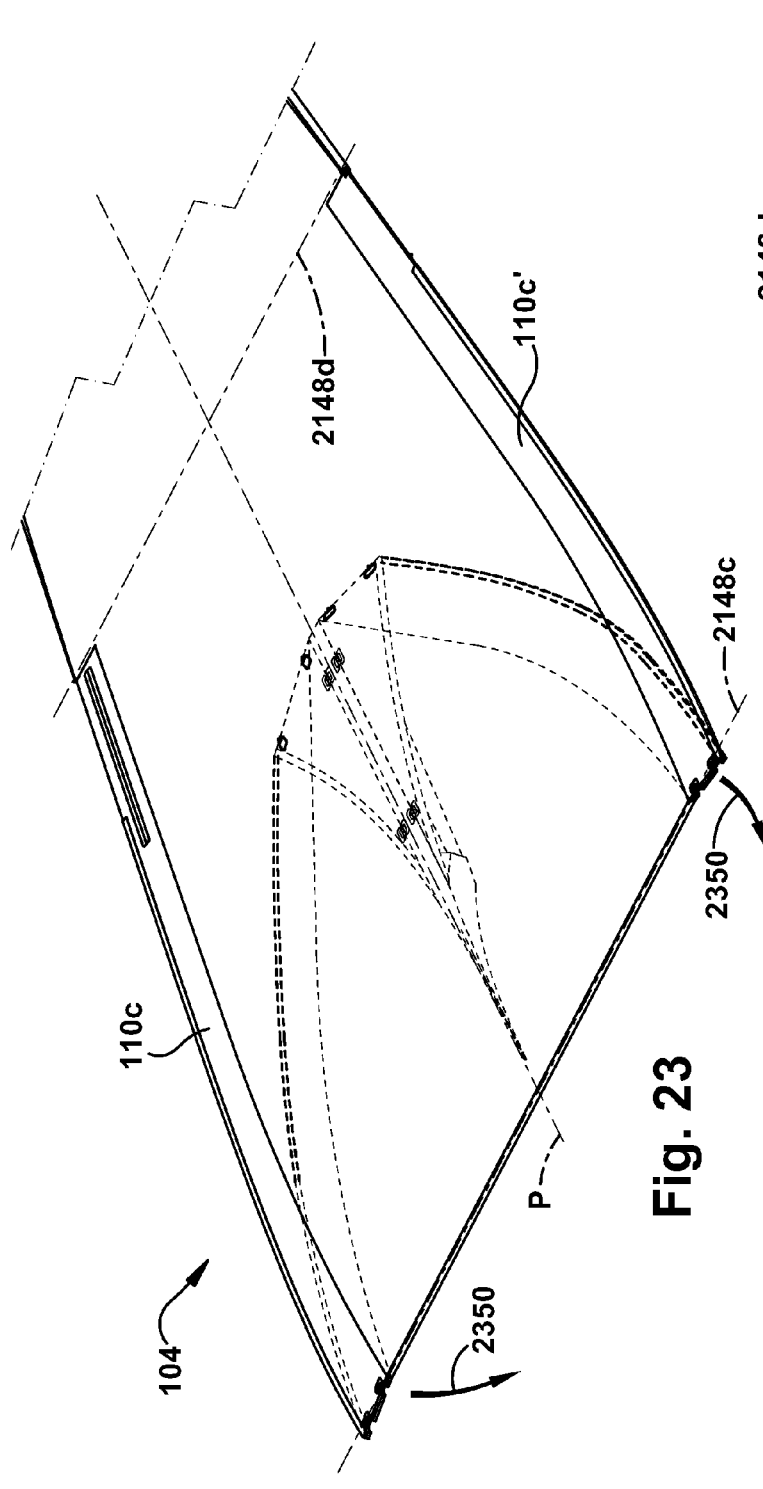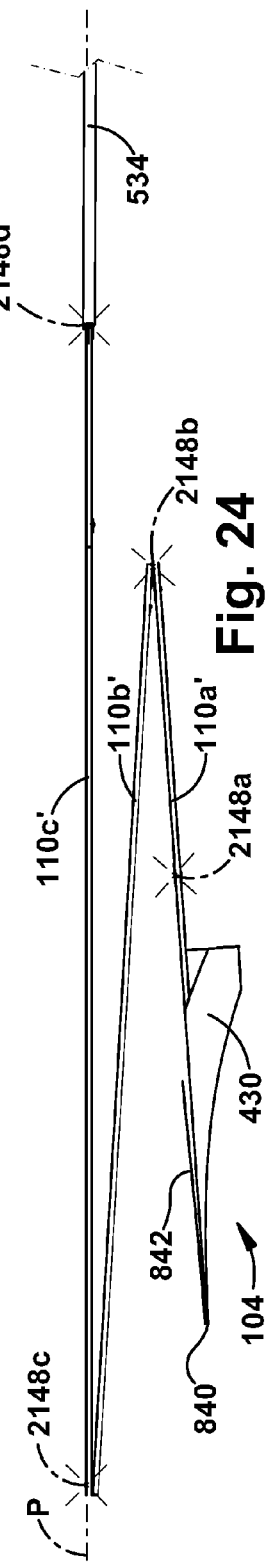

SPACE-BASED OCCULTER

TECHNICAL FIELD

The present invention relates generally to space exploration, and more particularly to a space-based occulter.

BACKGROUND

High contrast imaging has a number of applications including capturing an image when the target is actually trying to blind the observer, and attempting to image reflections close to a bright source. Particular applications considered herein address imaging of planets circling other stars; for example, it may be desirable to image planets in an attempt to discover Earth-like planets which may harbor extraterrestrial life. To find and directly observe planets, one needs to study stars as distant as 10 parsecs. The Earth is $10^{10}$ times fainter than the Sun and, from a distance of 10 parsecs, the two are less than a tenth of an arcsecond apart.

An occulter is an opaque or partially transmitting mask that is placed in the field of view of a camera or telescope to throw a shadow of the bright source onto the imaging optic. Occulters have the singular property that they remove most of the radiation from the bright source within a critical radius before it enters the imaging optics. Light from the faint source outside the critical light blocking radius of the occulter then becomes observable by the telescope optic and may be viewed without interference from the bright source.

A space-based occulter can have a flower-like shape with a solid inner disk and shaped petals that occult on-axis starlight. This allows the off-axis light from companion objects, such as a terrestrial planet, to be discerned by a telescope. A known space-based occulter design can be formed from a Kapton® blanket with Kapton® edges. Kapton® is a registered trademark for a polyimide film available from E. I. du Pont de Nemours and Company of Wilmington, Del. The Kapton® blanket structure provides for a readily foldable occulter that can be inserted into a 5 meter diameter fairing for launching and deploying in space. However, since Kapton® has a relatively high coefficient of thermal expansion ("CTE"), such an occulter has been determined to provide unreliable operation due to excessive contraction and expansion of the Kapton® edges.

SUMMARY

Systems and methods are provided for a space-based occulter.

In an embodiment of the present invention, a space-based occulter selectively movable between a stowed configuration and a deployed configuration is described. A base hub has a longitudinally oriented center axis. A plurality of petals are provided, each petal extending radially outward from, and spaced radially apart from, the base hub when in the deployed configuration. Each petal has a hypergaussian edge made up of a plurality of hypergaussian edge panels. Each hypergaussian edge panel defines a portion of the hypergaussian edge of the petal. Each hypergaussian edge panel is made substantially of a material having a near zero coefficient of thermal expansion. A circular central portion is located radially between the base hub and the plurality of petals. A covering skin extends laterally between the hypergaussian edges of each petal and over the circular central portion. The covering skin defines a substantially planar surface oriented substantially perpendicular to the center axis when the occulter is in the deployed configuration.

In an embodiment of the present invention, a space-based occulter, selectively movable between a stowed configuration and a deployed configuration, is described. A base hub has a longitudinally oriented center axis. A plurality of petals are provided, each petal extending radially outward from, and spaced radially apart from, the base hub when in the deployed configuration. Each petal includes a petal edge made up of a plurality of edge panels. Each edge panel defines a portion of the petal edge. A petal axis is located in a lateral center of the petal such that the petal edge is substantially laterally symmetrical about the petal axis. A plurality of hinges are provided, each hinge being located radially between two adjacent edge panels. A plurality of accordion fold lines are provided, each accordion fold line being defined by two laterally spaced hinges. The hinges are operative to allow pivotal movement between two adjacent edge panels about the accordion fold line. A circular central portion is located radially between the base hub and the plurality of petals. A covering skin extends laterally between the petal edges and over the circular central portion. The covering skin defines a substantially planar surface oriented substantially perpendicular to the center axis when the occulter is in the deployed configuration. During movement of each petal from the deployed to the stowed configurations, the petal is accordion-folded about the plurality of accordion fold lines to radially collapse the petal directly inward toward the center axis and the petal is longitudinally folded about the petal axis to laterally collapse the petal into at least a portion of a fin that reduces the total width of the panel in a lateral direction.

In an embodiment of the present invention, a space-based occulter is described. A base hub defines a longitudinally oriented center axis. A plurality of petals are provided, each petal extending radially outward from, and spaced radially apart from, the base hub when in the deployed configuration. Each petal has a hypergaussian edge made up of a plurality of hypergaussian edge panels and a tip fitting. Each hypergaussian edge panel defines a portion of the hypergaussian edge of the petal. A plurality of flexible tension links extend radially between at least one hypergaussian edge and the base hub. Each tension link is configured to exert a tensile force between at least one petal and the base hub. A plurality of telescoping booms are provided, each telescoping boom extending between a tip fitting and the base hub. Each telescoping boom is pivotally attached to the base hub for selective movement between radial and longitudinal orientations with respect to the base hub. Each telescoping boom is configured to selectively provide motive force oriented in the radial direction to facilitate at least one of reduction and expansion of each petal in cooperation with the hinged attachment of the hypergaussian edge panels. Each telescoping boom is configured to resist the tensile force exerted on a respective petal by the tension link. A circular central portion is located radially between the base hub and at least one petal. A covering skin extends laterally between the hypergaussian edges of each petal and over the circular central portion. The covering skin defines a substantially planar surface oriented perpendicular to the center axis.

BRIEF DESCRIPTION OF THE DRAWINGS

FIG. 21 illustrates a partial top view of a single petal assembly in a deployed position in accordance with an aspect of the present invention.

FIG. 22 illustrates a partial side view of a single petal assembly in a deployed position in accordance with an aspect of the present invention.

FIG. 23 illustrates a partial top view of a single petal assembly in a stowed position in accordance with an aspect of the present invention.

FIG. 24 illustrates a partial side view of a single petal assembly in a stowed position in accordance with an aspect of the present invention.

DETAILED DESCRIPTION

The present invention will be shown and described as a space-based occulter including a plurality of petals having hypergaussian-shaped edges. However, the present invention is applicable to space-based occulters with edges of various other shapes, as well. In accordance with an example of a space-based occulter with hypergaussian-shaped petal edges, a space-based occulter is provided that uses a variety of structural components, described here as being largely formed from carbon fiber reinforced polymer ("CFRP") but which may be made of any suitable material(s), to deploy a dimensionally stable, multi-petal, hypergaussian type occulter, which could measure on the order of about 62 meters tip to tip, from a conventional 5 meter stowed configuration for launching in an evolved expendable launch vehicle ("EELV"). Therefore, the occulter, when in the stowed configuration, might measure no more than 5 meters in diameter so as to fit within the EELV compartment, or might have any other stowed measurements for a desired launch vehicle. In the described occulter, telescoping booms rotate and extend, deploying foldable edge panels to form the dimensionally stable CFRP perimeter. Deployment force is provided by spring driven root hinges and stem drives embedded within the telescoping boom. Deployed stiffness is at least partially obtained through latched root and panel-to-panel hinges, latched and compressively preloaded telescoping booms, and a tension path of edge panels and graphite links or cables. The deployed load path is comprised of primarily low CTE CFRP structures (which may be supplemented by some Invar [i.e., NiFe alloy] metallic stops and fittings). Deployed mass is minimized by covering greater than 84% of the interior area using a lightweight multi-layer insulated ("MLI") blanket. The MLI blanket surface is generally not required to be dimensionally stable, so may be intentionally rigged with blanket slack to prevent tensioning and hypergaussian edge loading when exposed to minimum space temperatures. A restraint system provides launch rigidity and strength as well as a large internal volume for the large MLI blanket to be folded for launch (>100/1 compaction by solid volume may be provided).

Figure 1:
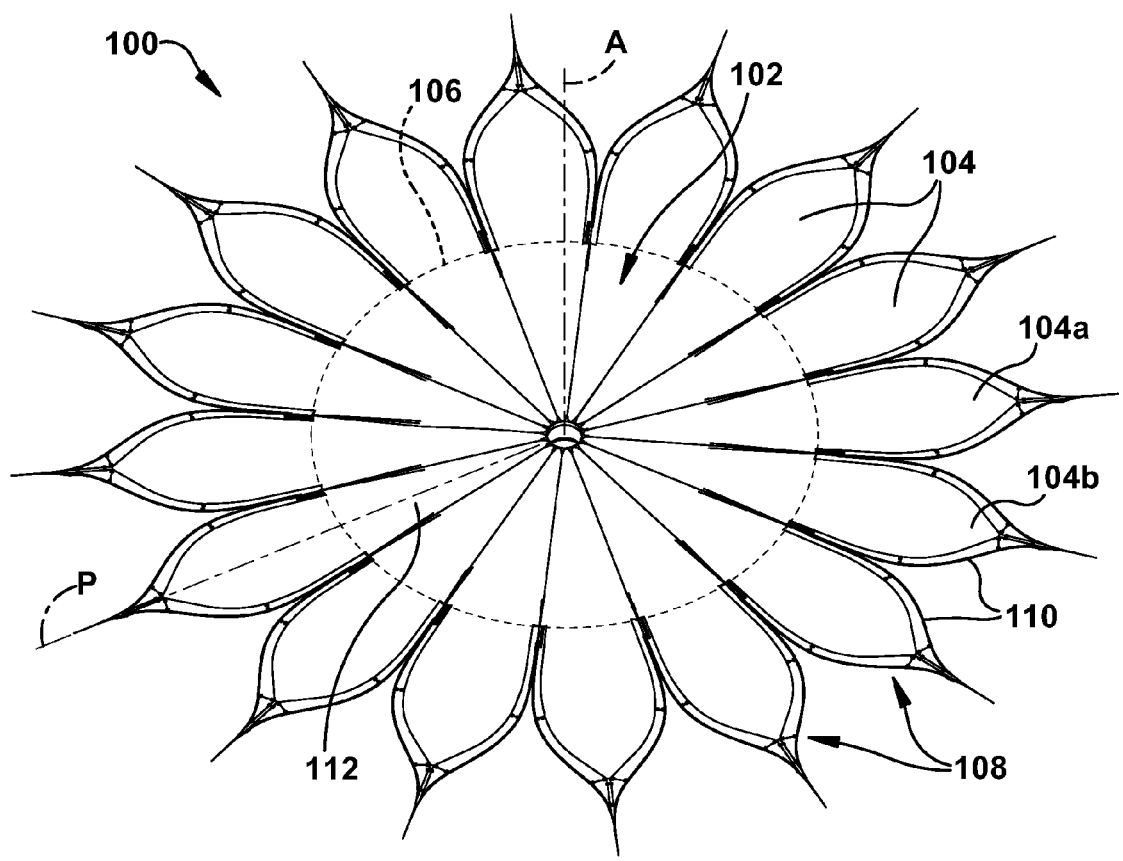
FIG. 1 illustrates a top perspective view of a deployed space-based occulter in accordance with an aspect of the present invention.

FIG. 1 illustrates a top perspective view of a space-based occulter 100 in a deployed position in accordance with an aspect of the present invention. The occulter 100 comprises a circular central portion 102 with a plurality of laterally arranged hypergaussian edge shaped petals 104 that extend radially outward about an outer perimeter 106 (shown in dashed line) of the circular central portion 102. The deployed occulter 100 shape with hypergaussian edge shaped petals 104 provides starlight suppression both in direct shading as well as reduction in starlight diffraction around the outer edges of the occulter.

For ease of description herein, the term "lateral" is used to indicate a direction of or relating to the side; for example, one hypergaussian edge 108 of a first petal 104a is located lateral to a neighboring hypergaussian edge 108 of a second petal 104b. The term "radial" is used herein to indicate a direction relating to, placed like, or moving along a radius of the space-based occulter 100, with each radius having an origin point along central axis A of the space-based occulter 100; for example, the petals 104 are located radially adjacent to the circular central portion 102. The "lateral" and "radial" features of the space-based occulter 100 as shown in the deployed configuration of FIG. 1 are located within a plane substantially perpendicular to central axis A. However, this will not always be the case, as will become apparent in the below description. The terms "proximal" or "inner" are used to refer to a position or structure situated at, extending toward, or closer than a reference structure to, the central axis A, while the terms "distal" or "outer" are used to refer to a position or structure situated or extending away from, or further than a reference structure from, the central axis A. The term "longitudinal" is used herein to refer to a direction parallel to the central axis A, with "upward" being toward the top of the page in the orientation of FIG. 1 and "downward" being longitudinally opposite the upward direction. For example, the deployed space-based occulter 100 depicted in FIG. 1 is a substantially planar structure extending radially outward from, and substantially perpendicular to, the center axis A.

Figure 18:
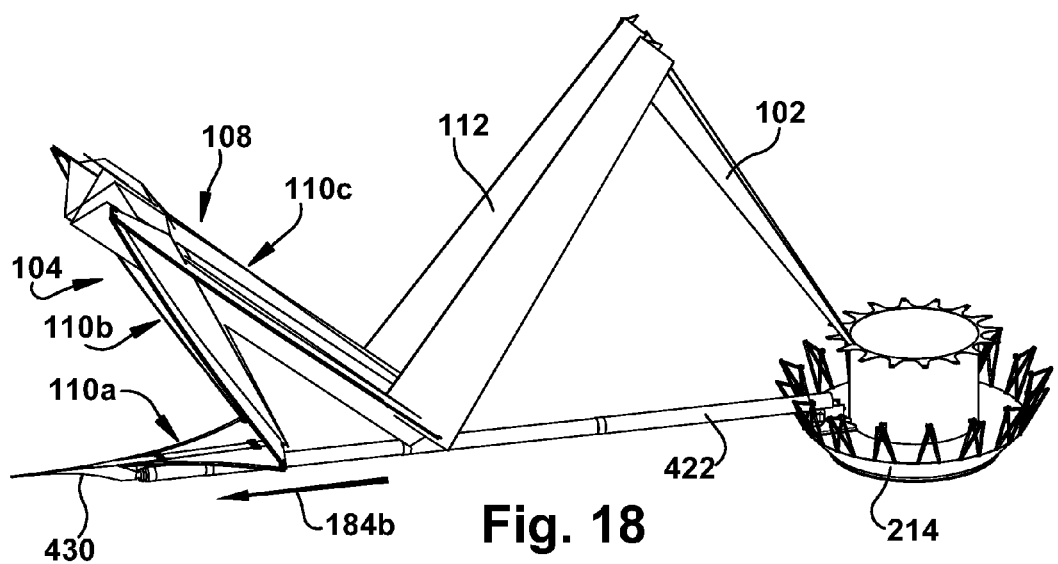

An "accordion fold" or "accordion-type fold" describes an arrangement of components hinged together and folded relatively back and forth at hinged or creased intersections to form an alternating orientation arrangement with a "zig-zag" cross-sectional profile; the accordion-folded structure may be compacted into a close-together stack of substantially aligned components (see, e.g., FIG. 16), or may be partially expanded with space between mutually angled components (see, e.g., FIG. 18). The accordion-folding technique is used herein to temporarily reduce the total length of an elongate structure for stowage. Due to the nature of the disclosed invention, a plurality of structures shown in the Figures may share the same element number (e.g., the plurality of petals 104). However, for clarity, only a sampling of this plurality for each multiple-type component are specifically called out with element numbers in the Figures; one of ordinary skill in the art will realize that the unnumbered remainder of that plurality are substantially similar to the one(s) specifically numbered.

The hypergaussian edges 108 of the petals 104 are formed of hypergaussian edge panels 110 formed of a material having a near zero CTE (e.g., CFRP facesheets over honeycomb panels, with the combination having a CTE in the range of $-3 \times 10^{-7}$ degrees $C^{-1}$ to $2 \times 10^{-6}$ degrees $C^{-1}$). This range of CTEs is available with any of a variety of composite materials and constructions that are suitable for use in the described space-based occulter 100, and which may be readily selected by one of ordinary skill in the art for use in a particular application of the present invention.

Accordingly, the hypergaussian edge panels 110 can substantially avoid heat-related warping and buckling arising from the varying temperatures in space and thus maintain their hypergaussian shape. The hypergaussian edge panels 110 are foldable in an accordion-fold manner via spring biased hinges, as will be discussed in detail below, to facilitate collapsing of the occulter 100 from the expanded, deployed position (depicted in FIG. 1) to a collapsed, stowed position (depicted in FIG. 2) and vice versa. A covering skin, such as the MLI blanket 112 described herein, extends between the hypergaussian edges 108 of the petals 104 and over the circular central portion 102. Each petal 104 defines a petal axis P, shown in FIG. 1 and described in detail below, with each petal axis P being located in a lateral center of the petal 104 such that the hypergaussian edge 108 of the petal is laterally symmetrical about the petal axis P. The location and orientation of each petal axis P may vary relative to central axis A during the stages of deployment of the occulter 100. Each petal axis P will intersect central axis A when the occulter 100 is in the deployed configuration of FIG. 1.

Figure 2:
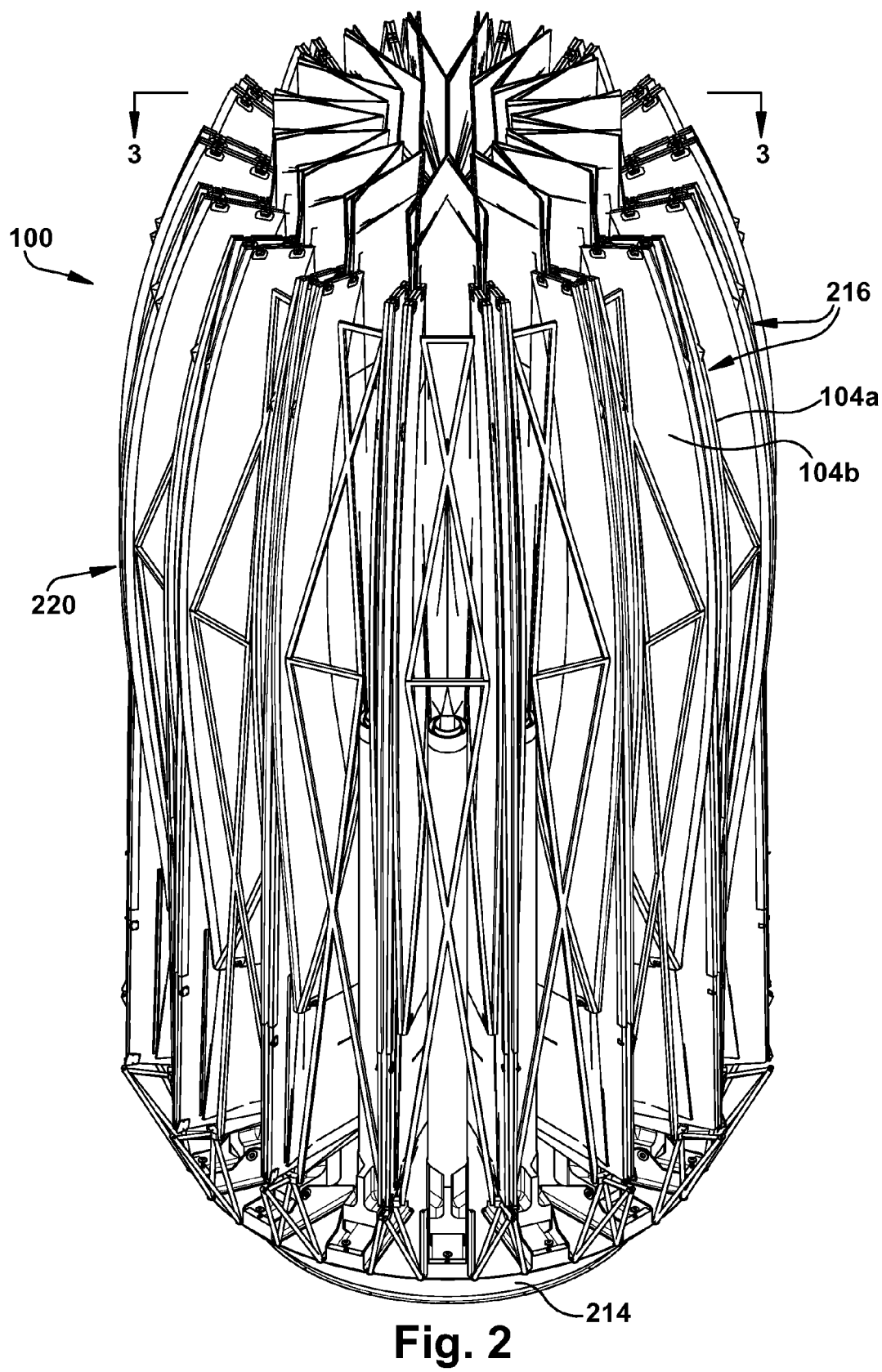
FIG. 2 illustrates a side view of a stowed space-based occulter in accordance with an aspect of the present invention.
Figure 3:
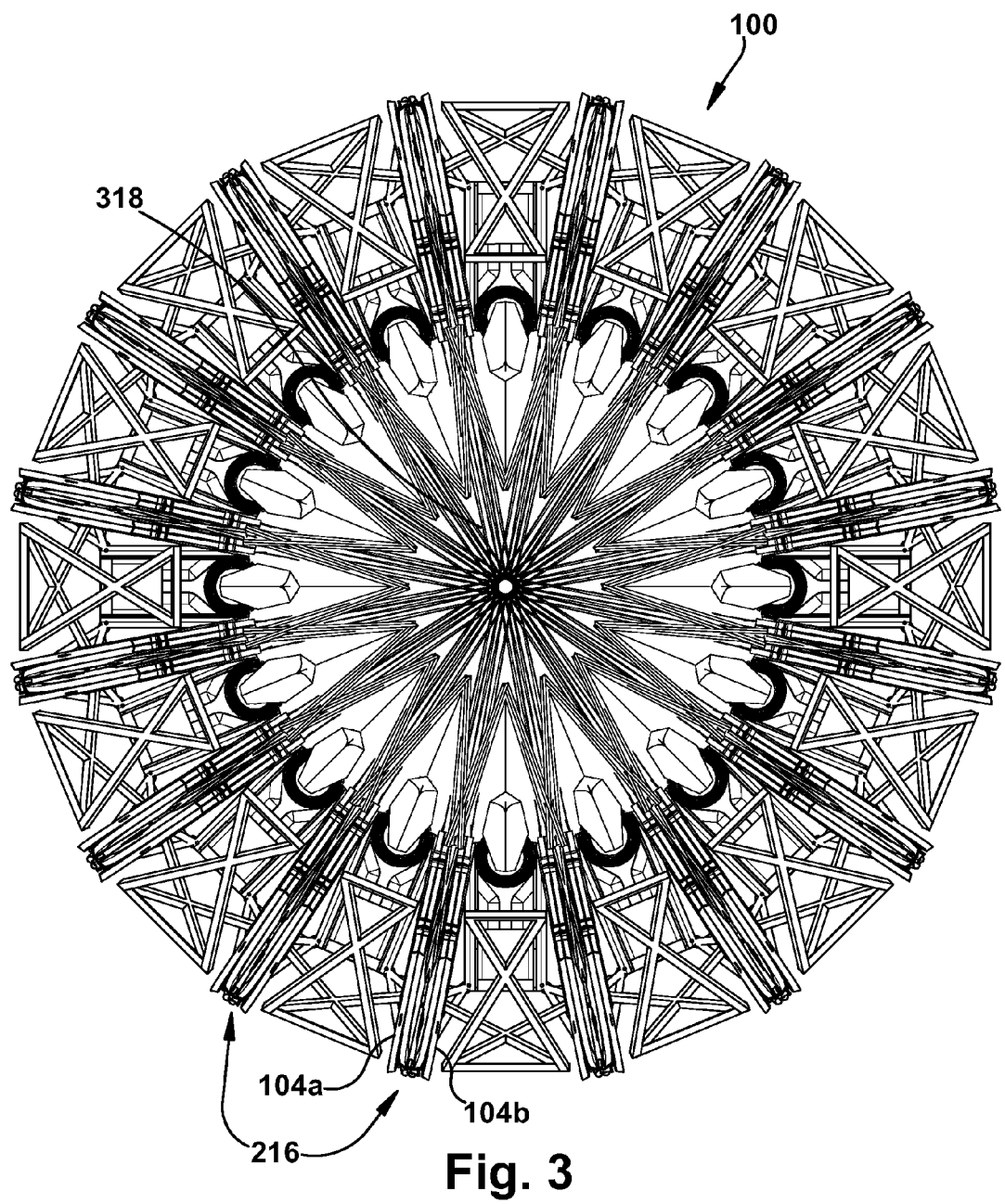
FIG. 3 illustrates a top view of a stowed space-based occulter in accordance with an aspect of the present invention.

FIG. 2 illustrates a side view of the space-based occulter 100 in a stowed position in accordance with an aspect of the present invention. FIG. 3, taken along line 3-3 of FIG. 2, illustrates a top view of the space-based occulter 100 in a stowed position in accordance with an aspect of the present invention. In this side view, a base hub 214, to which each of the hypergaussian edge petals 104 is pivotally attached, may be seen. The base hub 214, like all structures of the disclosed invention, may have any suitable size, shape, orientation, or other physical properties and may be made of any suitable material or combination of materials.

The stowed space-based occulter 100 is configured with a deployment mechanism that facilitates the successful delivery of a properly functioning occulter 100 into orbit in the deployed position. The space-based occulter 100, when in the stowed configuration, compacts the hypergaussian edge shape petals 104 (sixteen shown here) into a substantially cylindrical bundle, longitudinally oriented and arranged to fit in a 4.5-5 meter diameter stowed footprint, for compatibility with an EELV. The hypergaussian edge panels 110 are folded and arranged in a radial fin 216 orientation. Each fin 216 is defined by a first portion of a first petal 104 and a second portion of a second adjacent petal 104a. The petal edge panels 110 stow in an accordion-folded and packed arrangement six panels 110 deep with three panels 110 from each of the first and second petals 104 and 104a. The accordion-folded petals 104 are also configured for folding in a lateral direction, as can be seen in at least FIGS. 11 and 13 (and discussed below), to form the fins 216. An inner cylindrical volume 318 of the stowed space-based occulter 100 is used to stow the compacted MLI blanket 112 assembly. A launch lock caging system, shown generally at 220 and discussed in detail below, is connected to the base hub 214 and is used to provide structural rigidity and strength to the stowed space-based occulter 100 during launch. In this manner, the space-based occulter 100 may be maintained in the stowed configuration for a predetermined time period, which might include storage, launch, earth-based and/or outer-space transportation, or the like.

Figure 4:
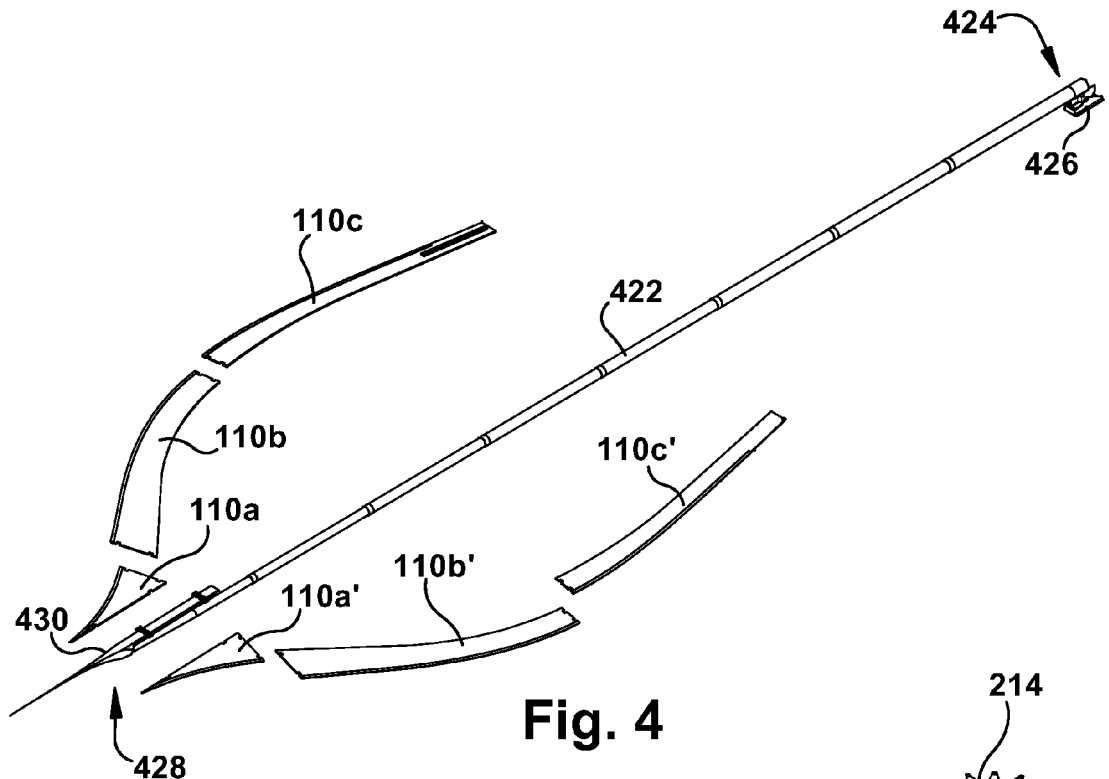
FIG. 4 illustrates a partial exploded view of individual parts of a single petal assembly in accordance with an aspect of the present invention.

FIG. 4 illustrates a partial exploded view of individual parts of a single petal 104 assembly, omitting the MLI blanket 112, in accordance with an aspect of the present invention. At a lateral center of the petal 104 assembly is a telescoping boom 422, shown in FIG. 4 in a deployed or extended position. A telescoping boom 422 is associated with each of the petals 104 of the occulter 100 and assists in deploying the petal 104 and adding stiffness and rigidity to the deployed occulter 100 structure. At a first end 424 of the telescoping boom 422 is a root hinge assembly 426 attaching the telescoping boom 422 to the base hub 214 while facilitating relative motion, such as about 88.5° pivotal rotation in a plane parallel to the center axis A, between the telescoping boom 422 and the base hub 214 during deployment. A tip fitting 430 is located at the distalmost end of the petal 104 and is connected to a second end 428 of the telescoping boom 422. The hypergaussian edge 108 comprises a plurality of hypergaussian edge panels 110a, 110a', 110b, 110b', and 110c, 110c' (the six shown here referenced collectively as "110"), which may be made with a "sandwich"-type construction using, for example, thin CFRP facesheets and a very light 25 mm aluminum core. The edges of the panels 110 may be trimmed using, for example, CFRP RTM stringers having a 20° bevel joined with a 100-micron radius to the telescope viewing side of the panel 110. The beveled sides (not shown) will be illuminated with sunlight and need to remain out of the field of view of a telescope. A first panel pair 110a/110a' is coupled to the tip fitting 430, a second panel pair 110b/110b' is coupled to the first panel pair 110a/110a', and a third panel pair 110c/110c' is coupled to the second panel pair 110b/110b'. Each panel pair 110/110' is hingedly attached to its neighboring panel pair(s) 110/110' and/or the tip fitting 430 to form the assembled structure shown in FIG. 5 using hinges 532, such as 180° deployment hinges. The tip fitting 430 defines a distalmost portion of the hypergaussian edge 108 relative to the base hub 214 when the space-based occulter 100 is in the deployed configuration. The hinges 532 are lightly spring-driven in the deployment direction, and have internal latching when deployed, thereby providing 6-degree-of-freedom latched joints.

Figure 5:
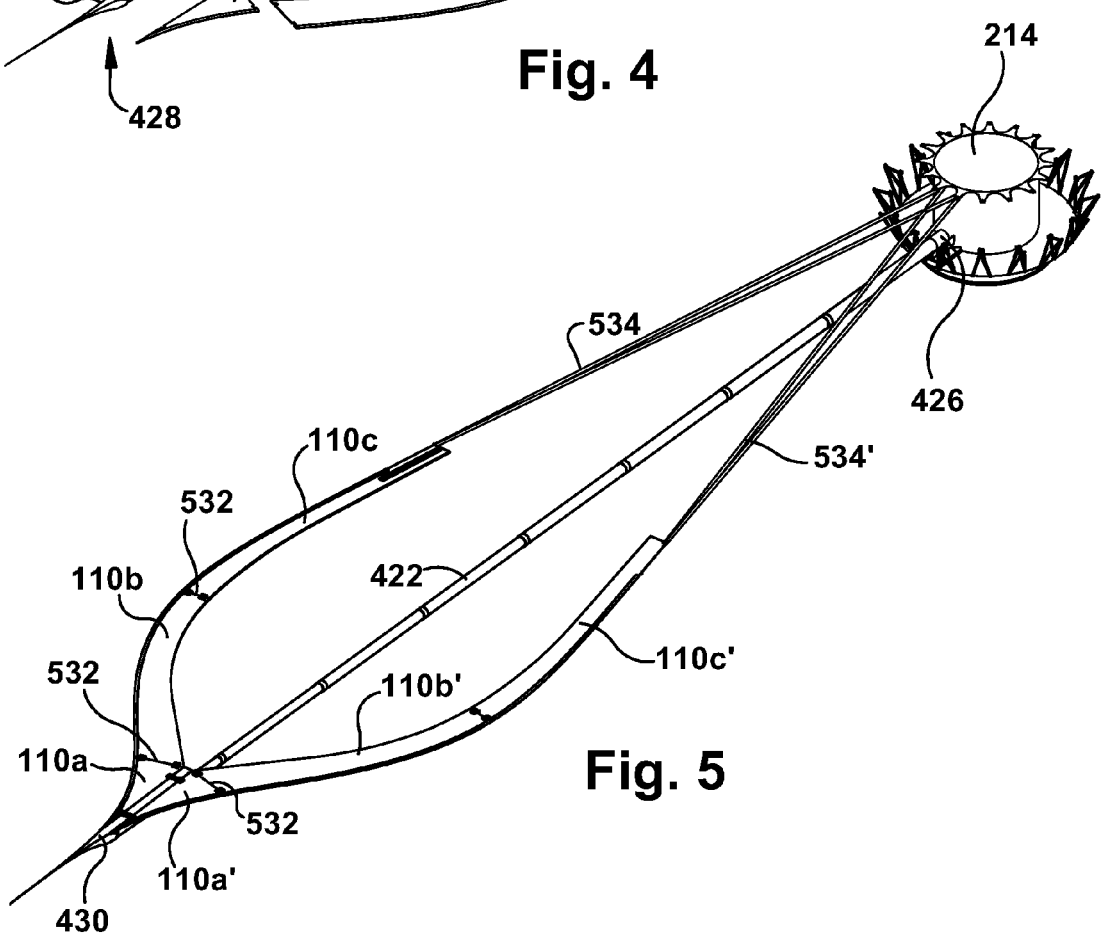
FIG. 5 illustrates the petal parts after petal assembly in accordance with an aspect of the present invention.

FIG. 5 illustrates the previously described petal 104 parts after petal 104 assembly in accordance with an aspect of the present invention. The petal 104 installation begins with the root hinge 426 being attached to the base hub 214. Panels 110a, 110a' of the first panel pair are attached to the tip fitting 430 and then panels 110b, 110b' of the second panel pair are attached to panels 110a, 110a', respectively. Next, panels 110c, 110c' of the third panel pair are attached to panels 110b, 110b' of the second panel pair. Tension links 534, 534', which may be, for example, CFRP cables of any desired rigidity (shown here as being flexible for ease of stowage), are attached between panels 110c, 110c' of the third panel pair and the base hub 214. The tension links 534 may include a pivot along their length, such as a conventional lug-in-clevis pinned joint, to permit folding for convenient stowing capability. The petal 104 installation and assembly shown in the sequence of FIGS. 4-5 can be repeated until all petal 104 assemblies (sixteen are used herein as an example) are assembled to the base hub 214.

Figure 6:
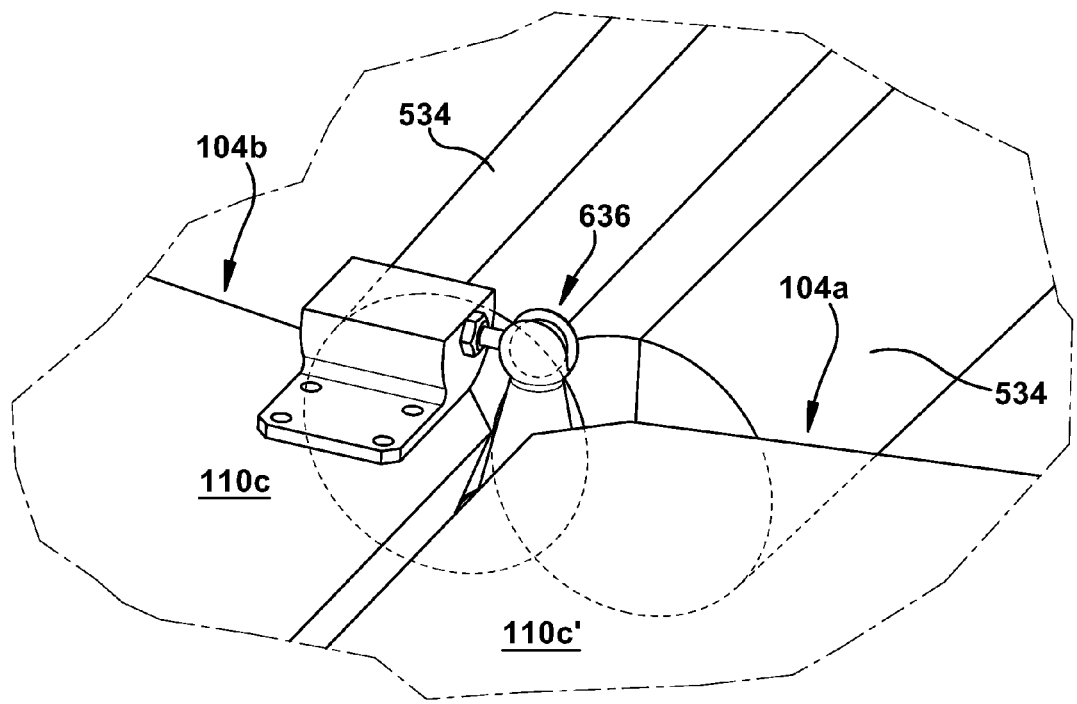
FIG. 6 illustrates a partial top perspective view of a petal-to-petal interface in accordance with an aspect of the present invention.
Figure 7:
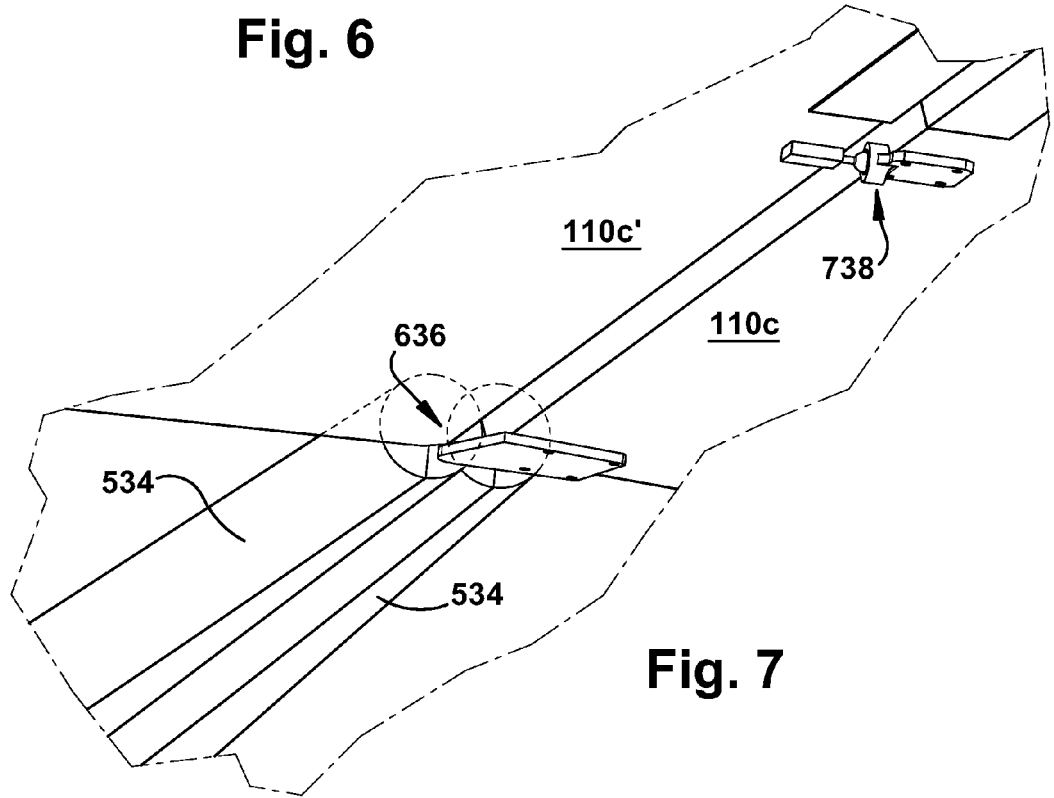
FIG. 7 illustrates a partial bottom perspective view of a petal-to-petal interface in accordance with an aspect of the present invention.

Optionally, adjacent petals 104a and 104b may be laterally secured to one another to increase stability of the deployed space-based occulter 100. For example, and as shown in FIG. 6, joints 636, which may be spherical deployment joints, can attach a pair of hypergaussian edge panels 110c and 110c' of adjacent petals 104a and 104b, respectively, to each other and deployment stops 738, which may be of the ball-and-cone type as shown in FIG. 7, are installed and adjusted to set a desired preload for the deployed space-based occulter 100. FIG. 6 illustrates a petal-to-petal spherical ball joint 636 that assists in the three-dimensional deployment action of the space-based occulter 100. When deployment nears completion (i.e., the petals 104a and 104b have almost reached their extended position lateral to one another), the joint 636 rotates a deployment stop 738 into its stop position, as can be seen in FIG. 7. This deployment stop 738 design uses a ball inside a conical socket for precise deployed positioning with high stiffness.

Figure 8:
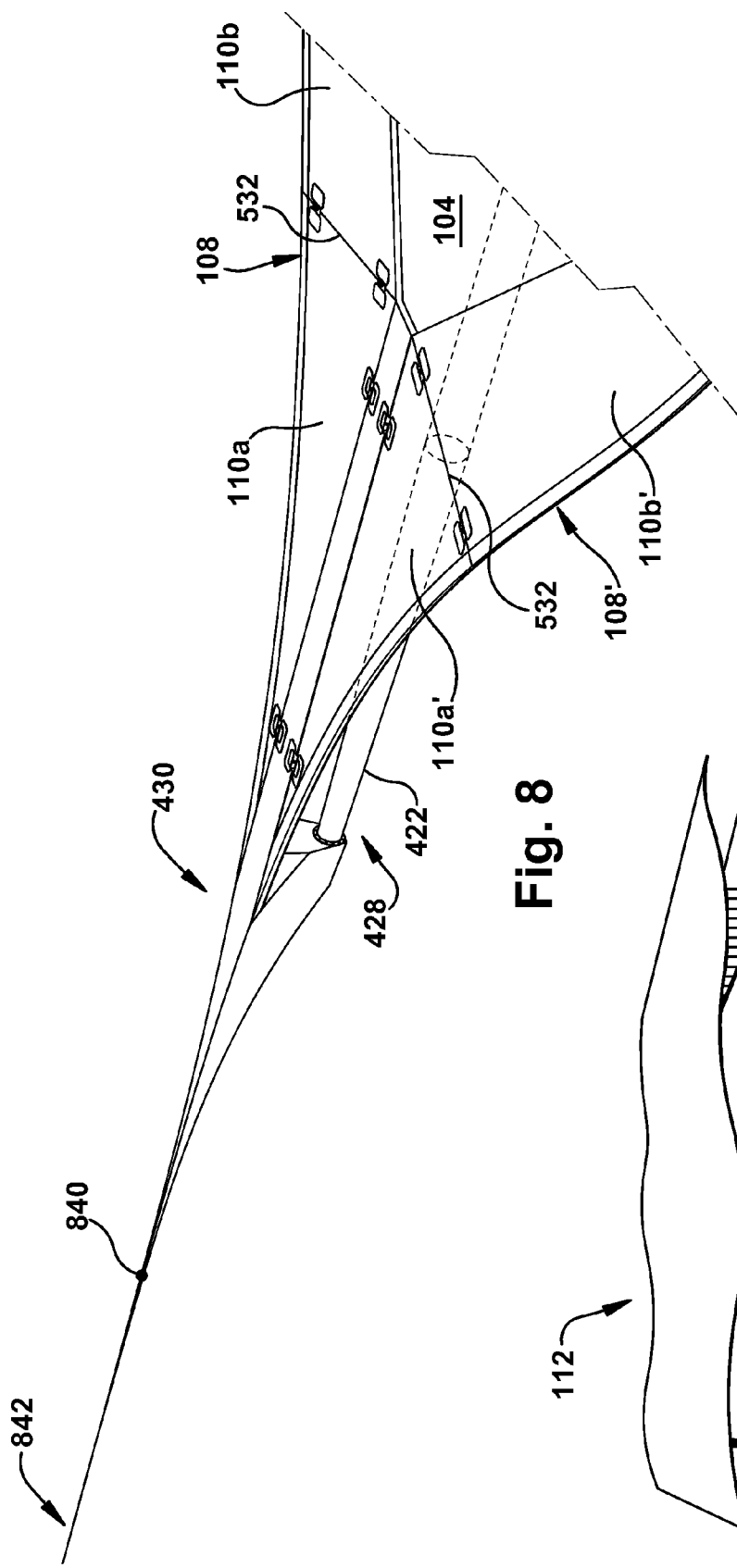
FIG. 8 illustrates a partial side perspective view of a petal in accordance with an aspect of the present invention.

FIG. 8 illustrates a magnified view of the tip fitting 430, which provides an intersection between the telescoping booms 422 and the hypergaussian edge panels 110 in accordance with an aspect of the present invention. A tip fitting 430, which may be made of a material such as graphite, is mounted on the second end 428 of the telescoping boom 422. The tip fitting 430, when in the stowed position, is arranged in such a way as to provide central pivot points for the outermost hypergaussian edge panels 110a and 110a', which have silhouettes flaring proximally outward from the tip fitting 430, as shown in FIG. 8. Stated differently, the tip fitting 430 continues the curved profile of the hypergaussian edges 108, 108' into a converging, pointed tip for each of the petals 104, which extends radially outward from the central axis A. A miniature hinge pivot 840 may also be provided to allow for pivotal deployment of a fine tapered tip wire 842 from the rest of the tip fitting 430, the tip wires 842 each serving to bring the distal ends of their respective hypergaussian petals 108 to an even finer and sharper distalmost point than that provided by the tip fitting 430, providing a physical approximation of a mathematical function converging toward infinity.

Figure 9:
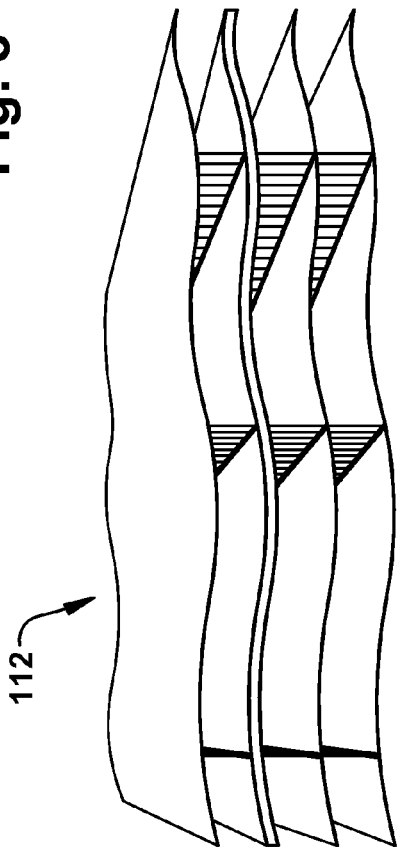
FIG. 9 illustrates a cutaway partial side perspective view of an MLI blanket in accordance with an aspect of the present invention.

FIG. 9 illustrates a cross section of an MLI blanket 112 in accordance with an aspect of the present invention. The MLI blanket 112 shown in FIG. 9, or another suitable flexible planar material, can be installed on the space-based occulter 100 assembly as shown and described herein, to suppress light impinging on a side of the occulter 100 opposite the telescope attempting to image an exoplanet, and a properly installed MLI blanket 112 will suppress that light impingement to substantially opaque levels. The example of FIG. 9 depicts a cross section of a four-layered Kapton® blanket having appropriate light blocking coatings and layer spacing, both of which should continue to meet light shading requirements even after years of operating in a micrometeoroid environment. The CTE of the MLI blanket 112 may present a thermal distortion problem for the hypergaussian edges 108 of the space-based occulter 100, so slack is designed into the MLI blanket 112 to prevent the MLI blanket 112 from tugging on the hypergaussian edges 108 during blanket expansion and contraction due to temperature swings during orbit. Layer spacing can be provided using spacers (not shown), such as "pop-up" Kapton® Z-shaped shear web stringers, built into the MLI blanket 112. The spacers, when present, eliminate the need for complex layer spreading mechanisms, and permit reliable layer spacing for micrometeoroid protection without the need for MLI blanket 112 layer tensioning. The MLI blanket 112 slack can be provided using slightly oversized blanket patterns, where the amount of oversize required in the blanket patterns is based upon, and proportional to, the CTE of the Kapton® material, in order to provide a very lightweight, highly compactable, and mission-robust MLI blanket 112 for lining and/or covering more rigid structures of the space-based occulter 100, as shown and described herein.

Figure 10:
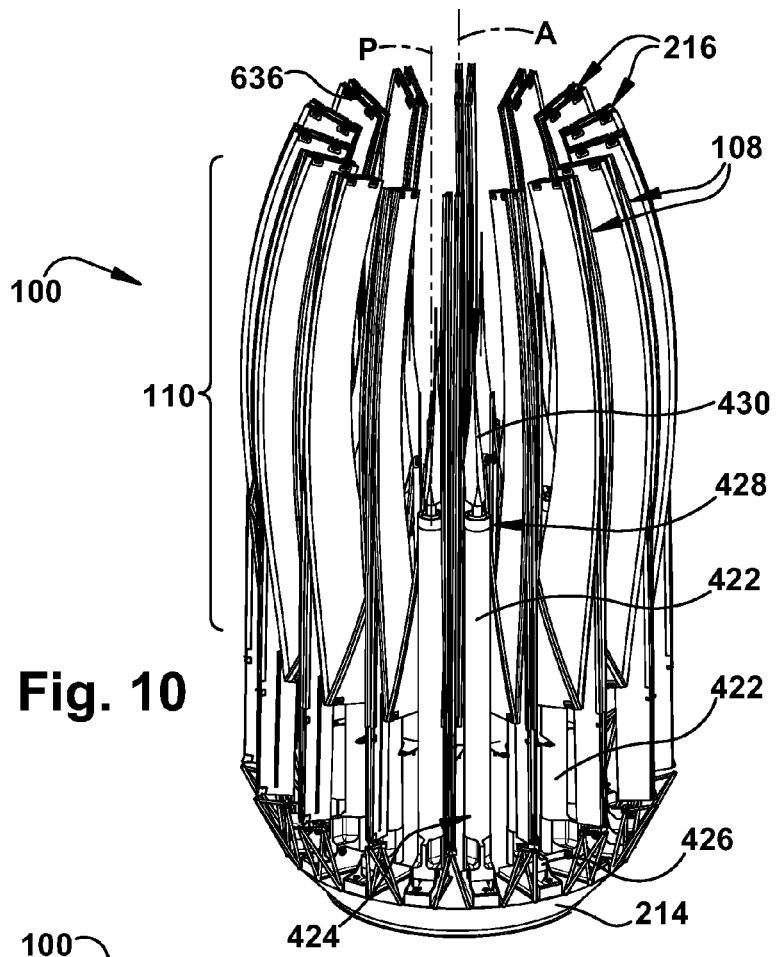
FIG. 10 illustrates a completed space-based occulter 100 assembly (with the MLI blanket 112 omitted for clarity of depiction) in a stowed position in accordance with an aspect of the present invention.

FIG. 10 illustrates a completed space-based occulter 100 assembly (with the MLI blanket 112 and launch lock caging system 220 omitted for clarity of depiction) in a stowed position in accordance with an aspect of the present invention. The hypergaussian edge panels 110 are folded in packs and arranged in a radial fin 216 orientation. Each fin 216 is comprised of a first portion of a first petal 104a and a second portion of a second adjacent petal 104b coupled together via a joint 636, such as the petal-to-petal spherical joint described with reference to FIGS. 6 and 7. Each petal axis P is located laterally between two fins 216 in the stowed configuration. A plurality of stowed telescoping booms 422 are each positioned alternately with the adjacent fins 216, with the second end 428 of each telescoping boom 422 connected to a tip fitting 430 of a respective petal 104, and the first end 424 of each telescoping boom 422 connected, via a root hinge assembly 426, to the base hub 214. Each telescoping boom 422 is oriented parallel to the center axis A when the space-based occulter 100 is in the stowed position shown in FIG. 10.

Figure 11:
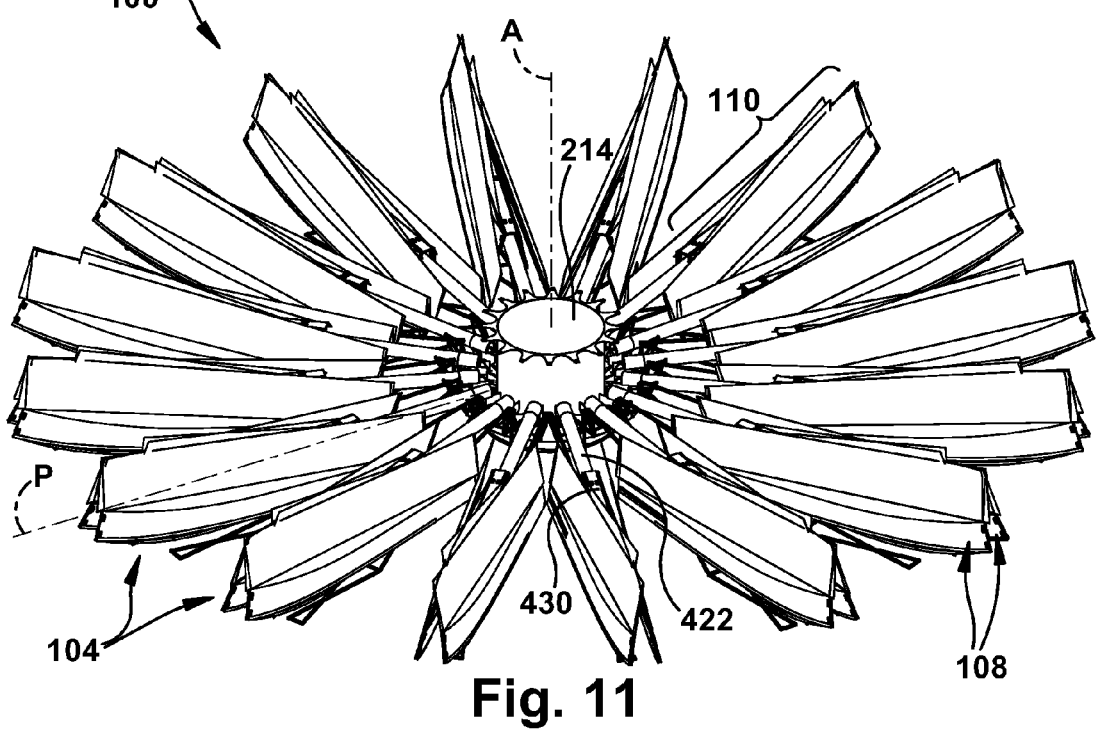
FIG. 11 illustrates a completed space-based occulter 100 assembly (with the MLI blanket 112 omitted for clarity of depiction) in a partially deployed position in accordance with an aspect of the present invention.

Deployment of the space-based occulter begins with actuation of the root hinge assemblies 426, which each positioned at the first end 424 of a respective telescoping boom 422. Each root hinge assembly 426 allows the attached telescoping boom 422 to pivot radially outward and downward from the initial, longitudinally oriented stowed position shown in FIG. 10 to the radially oriented deployed position of FIG. 11. This pivoting may take the telescoping boom 422 through a rotation in the range of 80-100° such as, for example, 88.5 degrees. The root hinge assembly 426 latches itself in the deployed position to provide a stiff base for each deployed telescoping boom 422. FIG. 11 illustrates a first deployment motion of the space-based occulter 100, with the MLI blanket 112 omitted, for clarity. As shown in FIG. 11, the adjacent hypergaussian edges 108, embodied in the hypergaussian edge panels 110, leave their stowed arrangement, in which they cooperatively formed the radial fins 216 (shown in FIG. 2), to begin separating and expanding out into the individual petals 104. Each fin 216 is disassembled or disappears as the hypergaussian edge panels 110 are pivoted laterally outward from the petal axis P to expand the petals 104 in the lateral direction, as shown by the transformation of the petals 104 in FIG. 13 to that of FIG. 15. The tip fitting 430 is still attached to the second end 428 of the telescoping boom 422, as shown in FIGS. 10 and 11. However, since the telescoping boom 422 is in a compacted, undeployed position in FIGS. 10 and 11, the tip fitting 430 and end wire 840 are nestled laterally between adjacent fins 216, which may help protect the delicate tip fitting 430 and end wire 840 from inadvertent yet damaging contact during handling, launch, and deployment of the space-based occulter 100.

Figure 12:
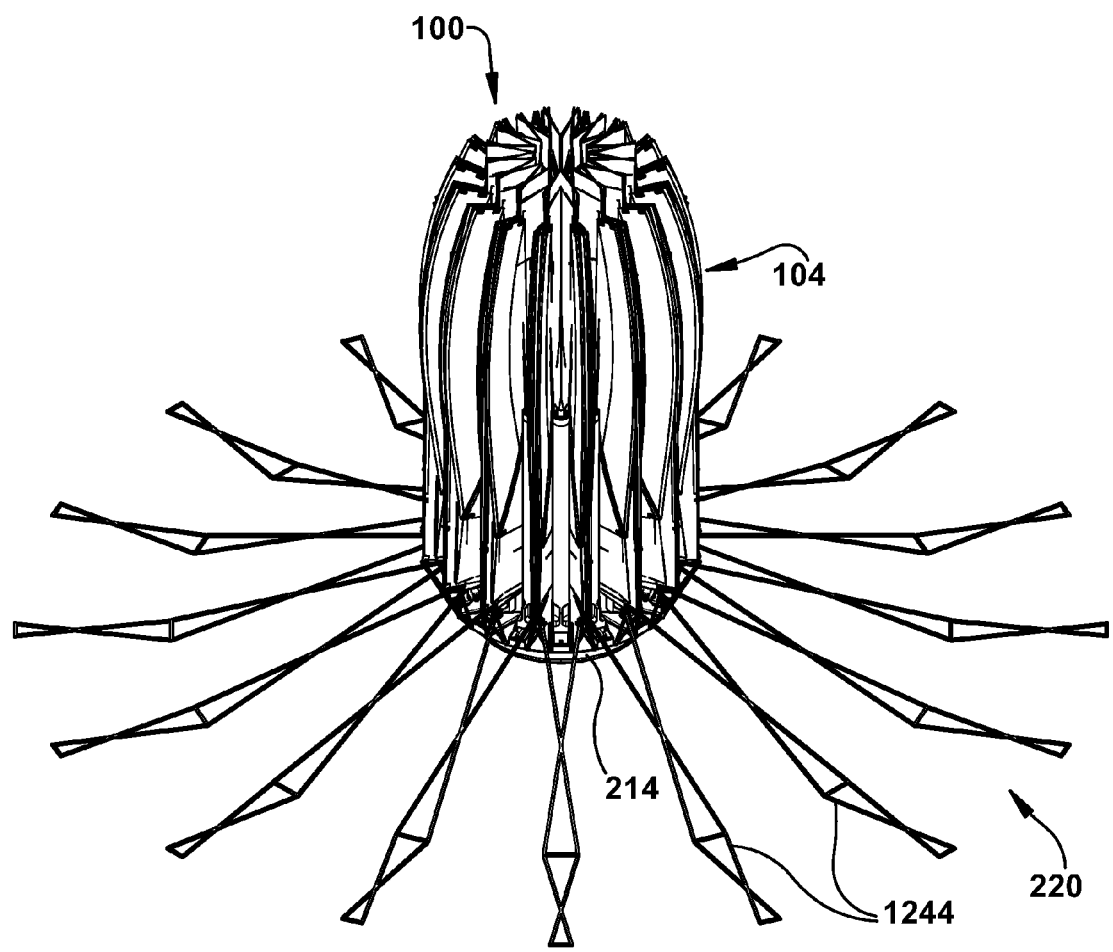
FIGS. 12-20 illustrate stages of deployment of the space-based occulter 100 from a fully stowed position to a fully deployed position.

FIGS. 12-20 illustrate stages of deployment of the space-based occulter 100 from a fully stowed position to a fully deployed position. In these Figures, the launch lock caging system 220 and MLI blanket 112 are shown in position. FIG. 12 illustrates perspective top view of a first step of deploying the space-based occulter 100 via opening of the launch lock caging system 220. The launch lock caging system 220 includes a plurality of deployable truss segments 1244 positioned on the outside of the stowed occulter 100, to help with maintaining the space-based occulter 100 in a stowed configuration during handling and launch. The number of truss segments 1244 are generally equal to the number of petals 104—sixteen are shown in these Figures as an example configuration. Remotely commandable release mechanisms (not shown) are actuated in this first step to release the truss segments 1244 from their initial upward longitudinal arrangement, enabling deployment springs (not shown) to pivot the truss segments 1244 radially downward from base mounted pivot points (not shown) on the base hub 214.

Figure 13:
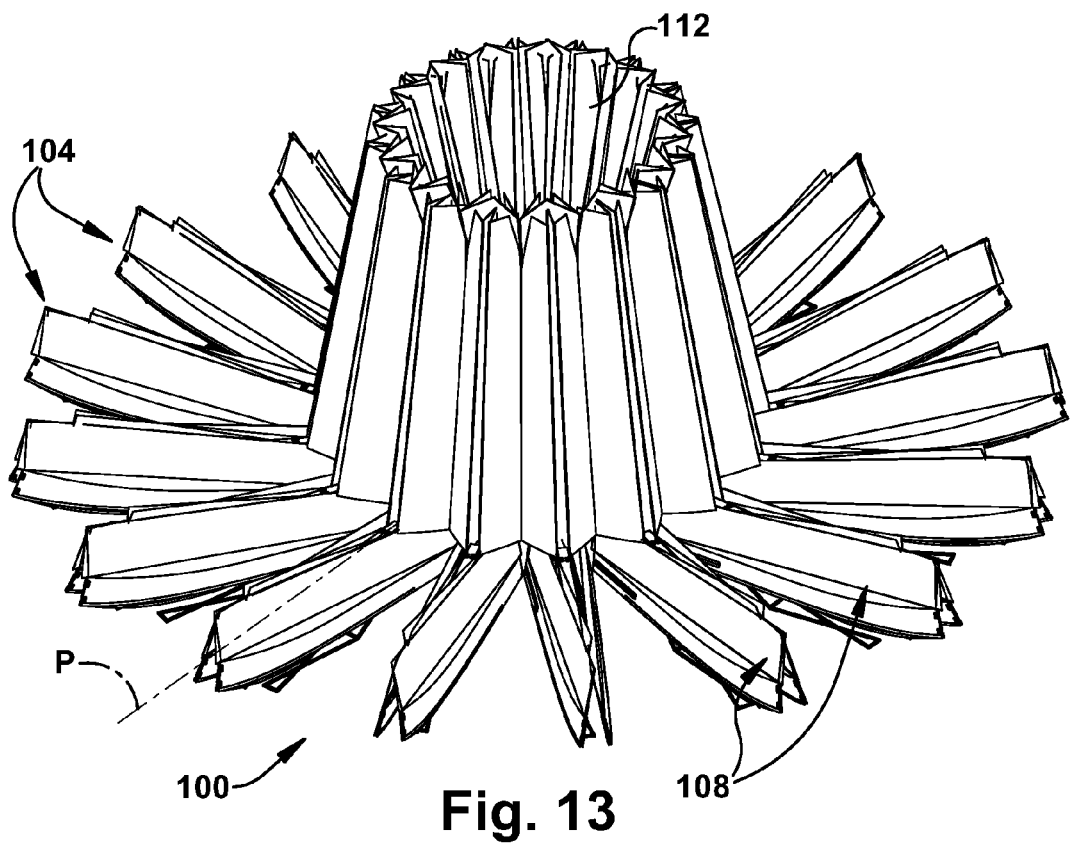
Figure 14:
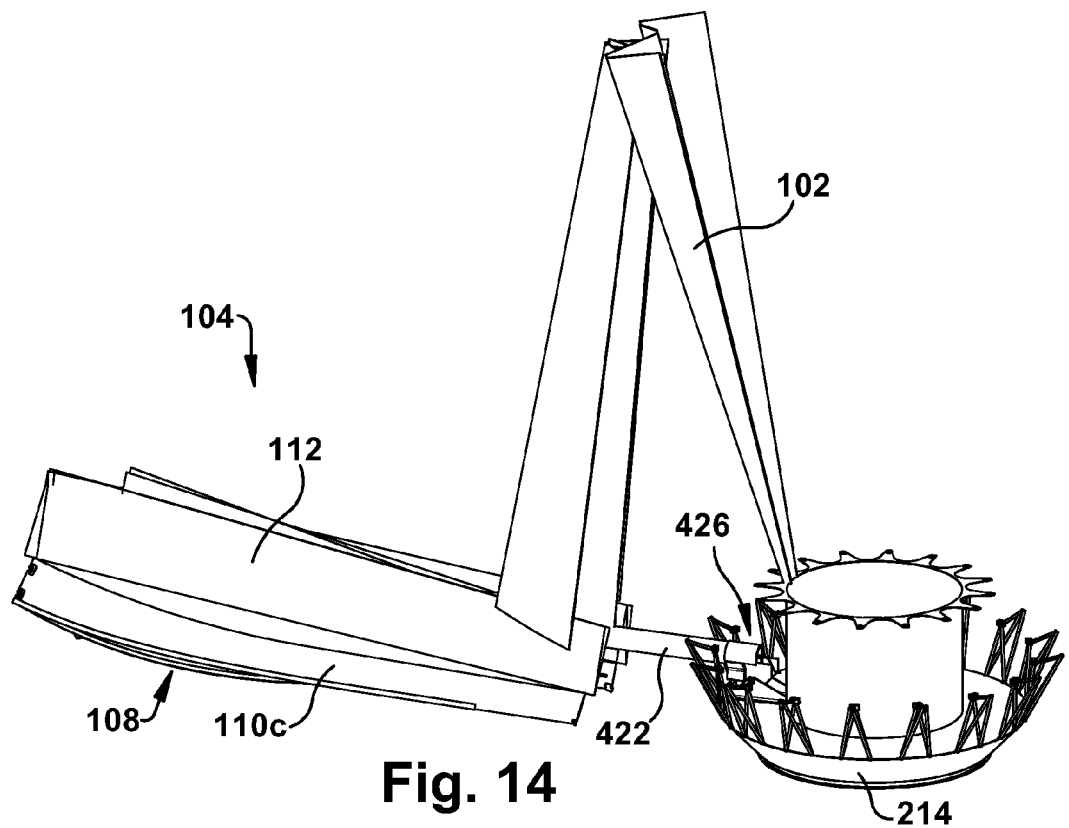

FIG. 13 illustrates a perspective top view of a second deployment stage of the space-based occulter 100, and FIG. 14 illustrates a partial side view of that same second deployment stage. The MLI blanket 112 begins to bloom and expand outward from the stowed position during this second step, as at least a portion of the MLI blanket 112 is controlled during deployment by the tension links 534 which, for a space-based occulter in the deployed position, underlie the circular central portion 102 of the MLI blanket 112. In the second step, shown in FIG. 13, each of the telescoping booms 422 is pivoted radially downward while still in a compacted configuration, and then locked into their final longitudinal position. For example, and as shown in the side view of FIG. 14 (which depicts a single petal 104), the telescoping boom 422 is pivoted approximately 88.5° (the amount of rotation shown here as an example) through actuation of the root hinge assembly 426 during the second deployment stage.

Figure 15:
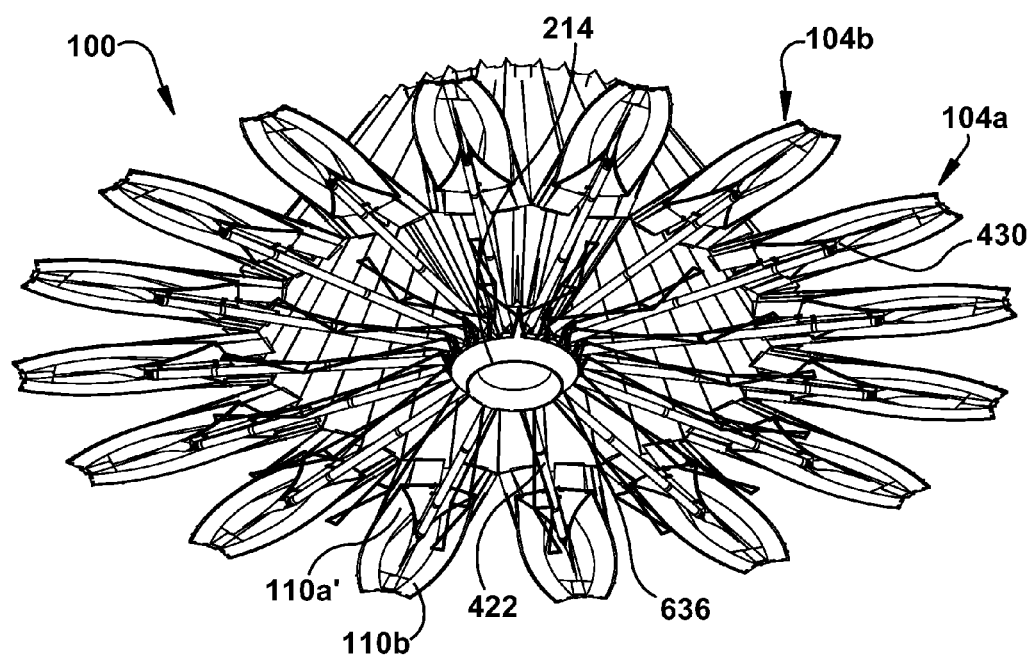
Figure 16:
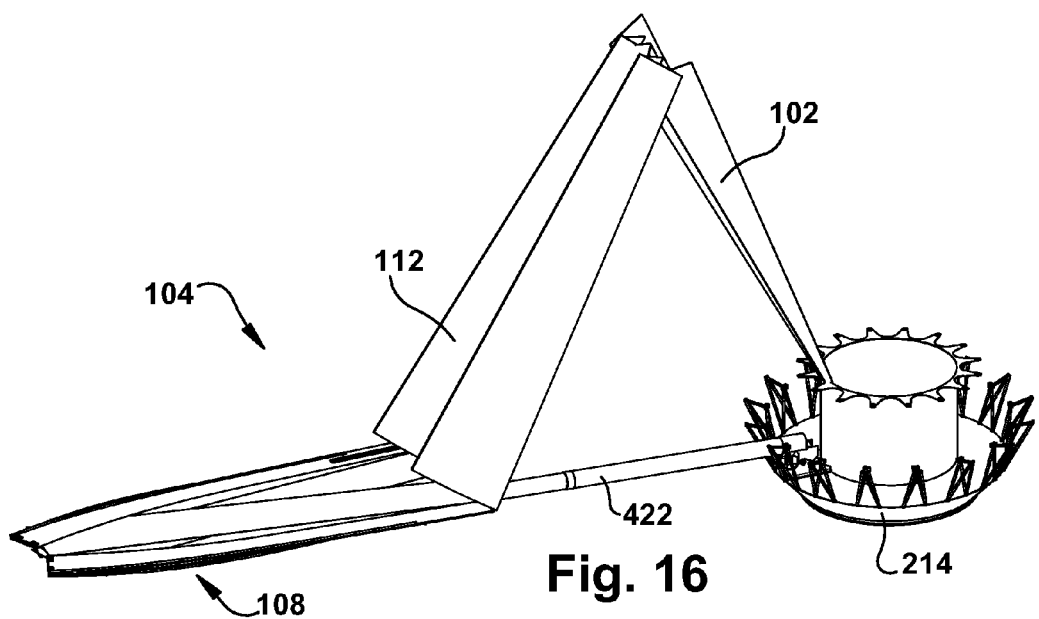

FIG. 15 illustrates a perspective bottom view of the third deployment stage of the space-based occulter 100, and FIG. 16 illustrates a partial side view of that same third deployment stage. The third deployment stage of the space-based occulter 100 is driven by the telescoping booms 422. The telescoping booms 422 might be similar to and/or a derivative of "stem-driven" astrobooms, as described in U.S. Pat. No. 5,315,795, issued 31 May 1994 to Daniel S. H. Chae et al., the entire contents of which are incorporated herein by reference, or may have any other suitable design. During the third deployment stage, the MLI blanket 112 is pulled out from its stowed position in the center of the partially deployed space-based occulter 100 and the hypergaussian edge panels 110, which had previously been accordion-folded for stowage, begin to naturally unfold under the motive force of the telescoping booms 422.

From the second deployment stage of FIGS. 13 and 14 to the third deployment stage of FIGS. 15 and 16, the petals 104 pivot from the longitudinally oriented folded configuration of FIG. 13 (which is an artifact of the stowed position of the petals 104, wherein they form the fins 216) into the laterally and radially oriented flat deployed configuration of FIG. 15. To cause this pivoting motion, the spherical deployment joints 636 between each pair of adjacent petals 104, 104*a* create a tangential panel deployment force as the joints 636 are driven further from the base hub 214. The panel-to-panel hinges 532 connect the hypergaussian edge panels 110, and also create a lower level drive force during the third deployment stage to drive the hypergaussian edge panels 110 into rigid configurations at the final deployed positions. FIG. 16 illustrates a position of a single petal 104 of the space-based occulter 100 at the second deployment stage. As can be seen in FIG. 16, all of the hypergaussian edge panels 110 are lying substantially flat within a lateral plane perpendicular to the center axis A during the third deployment stage.

In one aspect of the invention, the telescoping booms 422 might be designed/configured as desired to provide appropriate stowed/deployed lengths, as well as to exert the forces needed to provide a preloading capability to the deployed petals 104, which may be a force of approximately 100 Newtons. As an example, the telescoping booms 422 may be designed to employ a plurality of stages (for example, eight or nine), each made of thin wall CFRP tubing, or of any other suitable material or combination of materials. The base stage may have, for example, a 250 mm outer diameter and a wall thickness of 0.76 mm, with all remaining stages having, for example, a 0.38 mm wall thickness. Tube overlap sections can have doubled wall thickness for strength. A powered (e.g., spring-driven) root hinge assembly 426 may be attached to the first end 424 of each telescoping boom 422 and may employ a slowing mechanism (not shown), such as eddy current damper resistance, to slow deployment if desired. As previously described, a tip fitting 430, which may also be made of CFRP or any other suitable material, may be attached to the second end 428 of each telescoping boom 422 in any desired manner. The distalmost end of the tip fitting 430 may include a transition to a thin tip wire 842, considered herein to be a feature of the tip fitting 430, which has a very small diameter (for example, 0.12 mm) at the distalmost end thereof. Optionally, and as mentioned previously with reference to FIG. 8, the tip wire 842 may be folded radially backward onto the tip fitting 430 for stowage, with the help of a miniature hinge pivot 840, and then may pivot in any suitable manner radially outward from the tip fitting 430 for radial extension distally from the petal 104 in the final deployed arrangement of the space-based occulter 100.

Figure 17:
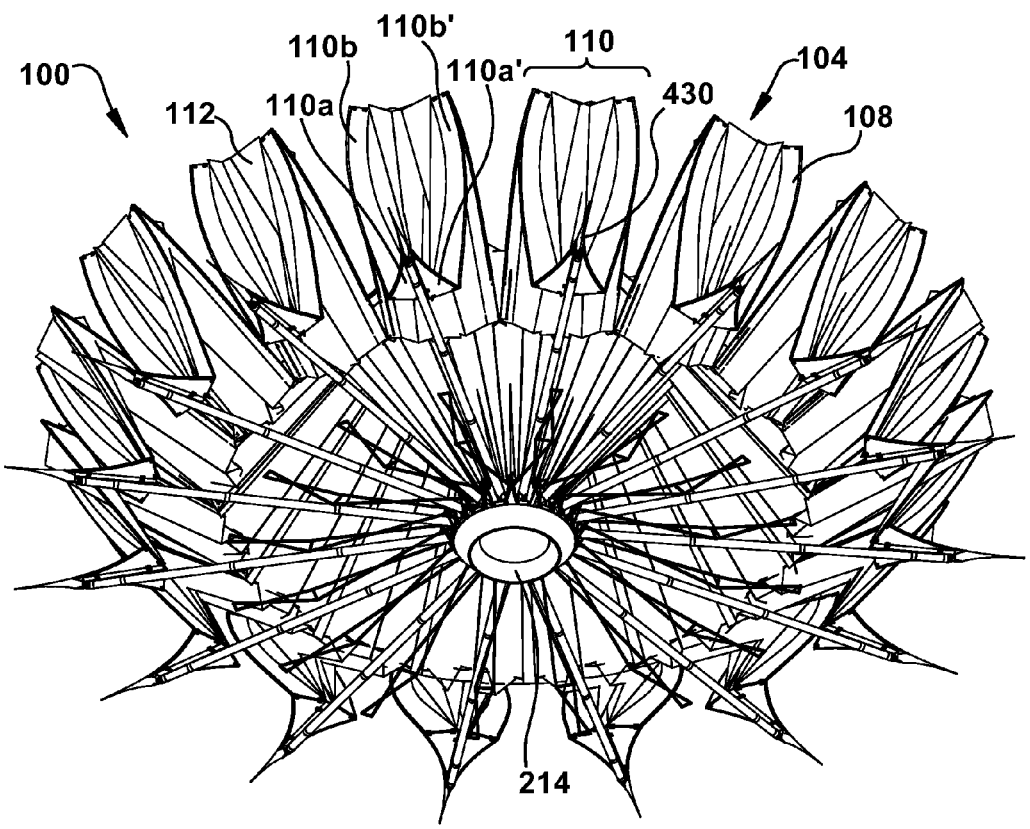

FIG. 17 illustrates a perspective bottom view of the fourth deployment stage of the space-based occulter 100, and FIG. 18 illustrates a partial side view of that same fourth deployment stage. At the fourth deployment stage, the tip fitting 430 extends radially from the base hub 214, in the direction of the radial arrow 1846, driven by the telescopic expansion of the telescoping boom 422. The tip fitting 430 is driven radially past the distalmost edge of the accordion-folded hypergaussian edge panels 110, thus causing the edge panels 110 to deploy further. FIG. 18 illustrates a position of a single petal of the space-based occulter 100 at the fourth deployment stage. As shown in FIGS. 17 and 18, the various hypergaussian edge panels 110 rotate relative to one another under the influence of the radially moving tip fitting 430, causing certain of the edge panels 110*b*, 110*b*' to at least partially rise longitudinally, out of the planar position shown in FIG. 16. In other words, the proximalmost end of the petal 104 is anchored at the base hub 214, and the hypergaussian edge panels 110 are accordion-folded as shown in the Figures with the distalmost end of the petal 104 attached (directly or indirectly) to the second end 428 of the telescoping boom 422. The radial expansion of the telescoping boom 422 causes the two ends of the petal 104 to be pulled radially apart, thus pivoting various ones of the hypergaussian edge panels 110 relative to one another to unfold the petal 104 and place the petal 104 into the fully deployed configuration.

Figure 19:
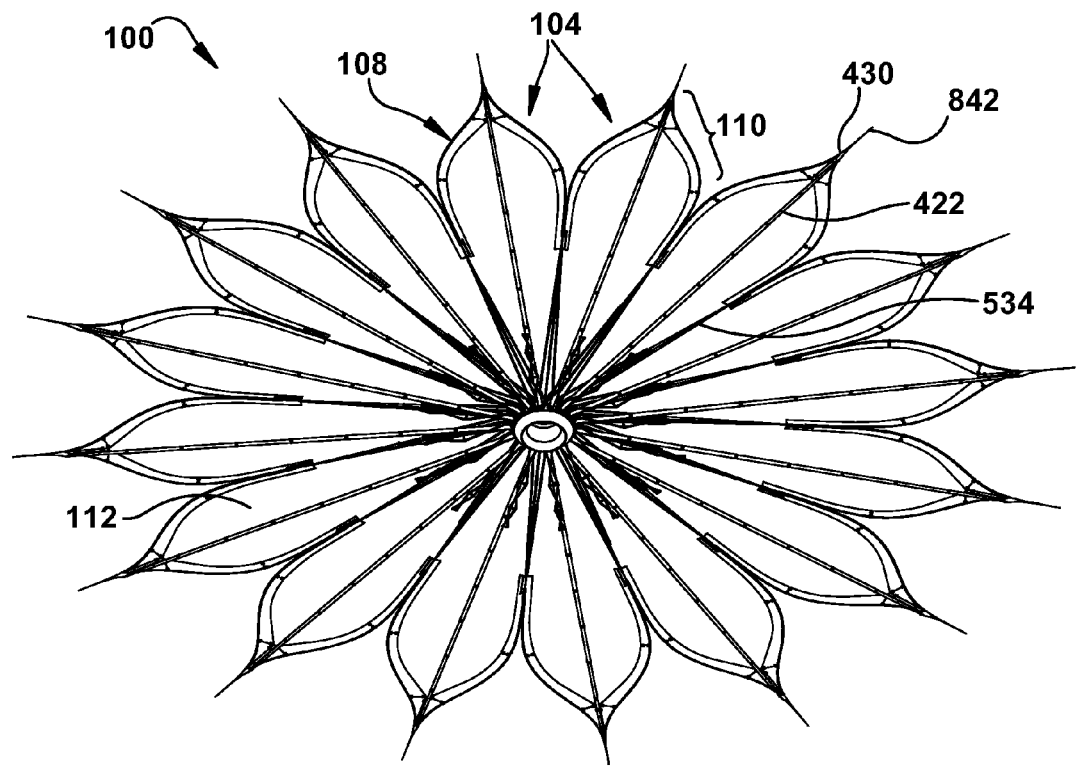
Figure 20:
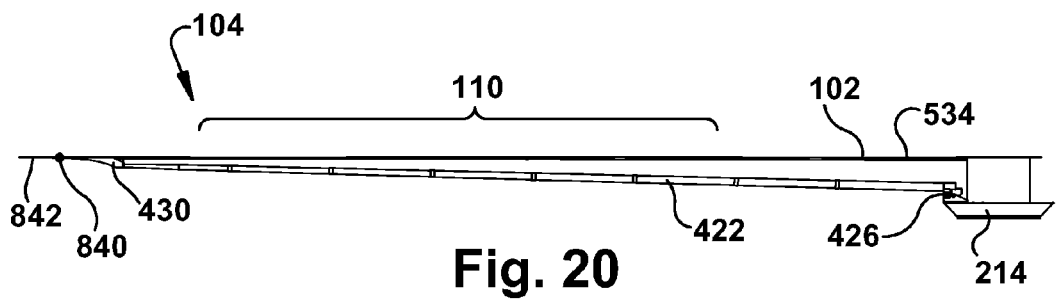

FIG. 19 illustrates a perspective bottom view of the fifth, and final, deployment stage of the space-based occulter 100, and FIG. 20 illustrates a partial side view of that same fifth deployment stage. At the final deployment stage, the telescoping booms 422 are fully extended and the tip fittings 430 extend radially outward from the base hub 214 to define the distalmost extent of the petals 104 of the space-based occulter 100. When present, the tip wires 842 may be released and/or urged by a motive driver (not shown) to pivot radially outward about the miniature hinge pivots 840 to further delineate the hypergaussian edges 108 of the petals 104. The tension links 534 pull radially inward toward the base hub 214 to tension the hypergaussian edge panels 110, as the telescoping booms 422 resist the tensile force applied by the respective tension links 534 to maintain the petals 104 in the fully deployed configuration. As the petals 104 become fully deployed, the MLI blanket 112 is drawn across the circular central portion 102 to substantially cover that area radially between the circular central portion 102, as well as covering the plurality of petals 104 in the depicted final deployment configuration. FIG. 20 illustrates a position of a single petal of the space-based occulter 100 at the final deployment stage. In this final deployment stage, the components of the space-based occulter 100 achieve a static balance, wherein the occulter 100 is held in the depicted fully deployed configuration for as long as desired under its own internal forces. The MLI blanket 112 is held a substantially flat planar arrangement, substantially perpendicular to the center axis A, and the space-based occulter 100 is accordingly ready for use in assisting with blocking a bright light (e.g., the light from a star) to allow a telescope or other optical device to discern dimmer lights from objects nearby the source of the bright light.

FIGS. 21 and 22, which are top and side views, respectively, of a single petal 104 in a deployed configuration, are included to more specifically depict the series and direction of folds used to bring the petal 104 into the stowed configuration. In FIGS. 21 and 22, the MLI blanket 112 is omitted, for clarity. As shown in FIG. 21, the hypergaussian edge panels 110a, 110a', 110b, 110b', 110c, 110c' and the tip fitting 430 are attached together into the depicted configuration by a plurality of hinges 532. The petal 104 is substantially laterally symmetrical about the petal axis P. Each laterally spaced/opposed pair of hinges 532 defines an accordion fold line 2148 as shown in FIG. 21, as do the most proximal ends of the inner hypergaussian edge panels 110c, 110c'. The depicted accordion fold lines 2148 are merely provided as examples, and may be located differently or omitted entirely, depending upon the specific configuration of the petal 104 assembly. For example, when the tip fitting 430 is rigidly attached to the adjacent hypergaussian edge panels 110a, 110a', the distalmost accordion fold line 2148a may be absent.

These accordion fold lines 2148 are the lines at which the petal 104 folds in a zig-zag fashion to radially compact into the stowed configuration. For example, the accordion fold lines 2148 extend into the plane of FIG. 22, and are therefore shown as "x"s. The distalmost accordion fold line 2148a moves relatively downward to allow the adjacent tip fitting 430 and hypergaussian edge panels 110a, 110a' to pivot about the hinges 532 (and therefore about the accordion fold line 2148a) relative to each other in an upward direction. Moving left to right in FIG. 22, the next proximal accordion fold line 2148b moves relatively upward to allow the adjacent hypergaussian edge panels 110a, 110a' and 110b, 110b' to pivot about the hinges 532 (and therefore about the accordion fold line 2148b) relative to each other in a downward direction. The next proximal accordion fold line 2148c moves relatively downward to allow the adjacent hypergaussian edge panels 110b, 110b' and 110c, 110c' to pivot about the hinges 532 (and therefore about the accordion fold line 2148c) relative to each other in an upward direction. The distalmost accordion fold line 2148d moves relatively upward to allow the adjacent hypergaussian edge panels 110d, 110d' to pivot about the hinges 532 (and therefore about the accordion fold line 2148d) relative to the tension links 534 in a downward direction. (Depending upon the flexibility of the tension links 532, the distalmost accordion fold line 2148d may not be clearly defined or may even be absent.) Consequently, the pivoting movements described herein and shown in the Figures can be carried out to start collapsing the petal 104 into the largely stowed configuration shown in FIGS. 23-24 under force directed substantially in the directly radially inward direction.

FIGS. 23-24 are similar to FIGS. 21-22, but show the petal 104 in a largely stowed position, rather than the deployed position of the latter Figures. For ease of depiction, the side view of FIG. 24 is shown with the hypergaussian edge panels 110 slightly separated from one another, but these hypergaussian edge panels 110 will more likely be tightly stacked in a typical stowed configuration in the field. Additionally, to correspond more closely to the embodiment of the occulter 100 shown in FIGS. 12-20, the tip fitting 430 is shown in FIGS. 23-24 as being rigidly attached to the adjacent hypergaussian edge panels 110a, 110a', thus absenting the distalmost accordion fold line 2148a.

Once the petal 104 has been accordion-folded about the accordion fold lines (1248b and 1248c shown here) to be collapsed in the radial direction as previously described, the petal 104 will be configured as depicted in FIGS. 23-24. In order to further collapse each petal 104 into the fully stowed configuration and form the fins 216, the petal 104 must be longitudinally folded about the petal axis P to collapse the petal 104 in the lateral direction. That is, each symmetrical "stack" of hypergaussian edge panels 110a/110b/110c and 110a'/110b/110c' is pivoted downward (as shown by pivotal downward arrows 2350 in FIG. 23) about the petal axis P to fully fold the petals 104 into the compact configuration shown in FIGS. 13 and 14. Having been both accordion-folded (the sequence from FIGS. 21-22 to 23-24) and longitudinally folded (the sequence from FIGS. 23-24 to 13-14), the petals 104 can then be pivoted upward and inward with respect to the center axis A into the fully stowed position shown in FIGS. 10 and 12. Because of the way that the joints 636 attach adjacent petals 104a and 104b, each fin 216 is cooperatively formed by a "stack" of accordion-folded hypergaussian edge panels 110a/110b/110c from one petal 104a and a "stack" of accordion-folded hypergaussian edge panels 110a'/110b/110c' from an adjacent petal 104b.

One of ordinary skill in the art will understand that the directions and interactions described immediately above for the stowing action are the reverse of the deployment directions and interactions previously shown and described in detail with reference to FIGS. 12-20. For example, during movement of each petal 104 from the stowed to the deployed configurations, the petal 104 is longitudinally unfolded about the petal axis P to laterally expand the petal 104 and the petal 104 is radially unfolded about the plurality of accordion fold lines 2148 to radially expand the petal 104 directly outward from the center axis A, as shown in the sequence of FIGS. 12-20.

The structural components described in the included discussion of the space-based occulter 100 result in a deployment scheme which employs a predictable, defined load path that may be modeled using finite element techniques. The telescoping booms 422 are preloaded in compression and then expand during deployment of the space-based occulter 100 to place the hypergaussian edge panels 110 and tension links 534 under tension, to substantially eliminate free play between the components and provide a predictable, repeatable hypergaussian edge 108 to each petal 104. The structure of the space-based occulter 100 may be made at least partially out of a near-zero CTE material, such as graphite or CFRP, to minimize thermal distortion and provide a precise hypergaussian edge 108 to each petal 104. It is contemplated that the above-described deployment sequence could be at least partially reversed at any time (including mid-deployment) to return the space-based occulter 100 to an at least partially stowed configuration.

What have been described above are examples of the invention. It is, of course, not possible to describe every conceivable combination of components or methodologies for purposes of describing the invention, but one of ordinary skill in the art will recognize that many further combinations and permutations of the invention are possible. For example, the dimensions given herein are merely provided as an example, and one of ordinary skill in the art could readily dimension the components of an occulter 100 for a desired use environment. As another example, the described components could be integrally formed as one piece or assembled from a plurality of subcomponents. Accordingly, the invention is intended to embrace all alterations, modifications, and variations that fall within the scope of this application, including the appended claims.

What is claimed is:

1. A space-based occulter, selectively movable between a stowed configuration and a deployed configuration, the occulter comprising:
a base hub having a longitudinally oriented center axis;
a plurality of petals, each petal extending radially outward from, and spaced radially apart from, the base hub when in the deployed configuration, each petal having a hypergaussian edge made up of a plurality of hypergaussian edge panels, each hypergaussian edge panel defining a portion of the hypergaussian edge of the petal, and each hypergaussian edge panel being made substantially of a material having a near zero coefficient of thermal expansion;
a circular central portion located radially between the base hub and the plurality of petals; and
a covering skin extending laterally between the hypergaussian edges of each petal and over the circular central portion, the covering skin defining a substantially planar surface oriented substantially perpendicular to the center axis when the occulter is in the deployed configuration.

2. The space-based occulter of claim 1, wherein the covering skin is a multi-layer insulated blanket.

3. The space-based occulter of claim 1, wherein the occulter further comprises a plurality of telescoping booms having spaced-apart first and second ends, each telescoping boom being associated with a corresponding one of the plurality of petals, and wherein each petal further comprises a tip fitting defining a distalmost portion of the hypergaussian edge relative to the base hub when the space-based occulter is in the deployed configuration, the first end of the telescoping boom being attached to the base hub for pivotal movement in a plane parallel to the center axis, and the second end of the telescoping boom being attached to the tip fitting, wherein telescopic expansion of the telescoping boom moves the tip fitting apart from the base hub as the occulter is moving from the stowed configuration to the deployed configuration.

4. The space-based occulter of claim 3, wherein each telescoping boom is oriented substantially parallel to the center axis when the occulter is in the stowed configuration and the second end of each telescoping boom pivots downward and radially outward in the plane parallel to the center axis as the occulter is moving from the stowed configuration to the deployed configuration.

5. The space-based occulter of claim 3, wherein each telescoping boom is oriented substantially perpendicular to the center axis and expands radially outward from the center axis to provide motive force to deploy an associated petal from a stowed configuration.

6. The space-based occulter of claim 5, wherein the hypergaussian edge panels and tip fitting of the petal are hingedly connected together to facilitate accordion-type folding of the petal in the stowed configuration, the telescoping boom providing motive force to unfold the petal from the accordion-type folded arrangement into the deployed configuration.

7. The space-based occulter of claim 1, including a launch lock caging system having a plurality of deployable truss segments pivotally attached to the base hub and positioned on a side of the stowed occulter opposite the center axis, each truss segment is configured to help maintain the occulter in the stowed configuration when oriented parallel to the center axis, and each truss segment is configured to pivot radially downward from the center axis to release the occulter for movement to the deployed configuration.

8. The space-based occulter of claim 1, wherein, when the occulter is in the stowed configuration, the plurality of petals are oriented substantially parallel to, and spaced radially apart from, the center axis to define an inner cylindrical volume located radially between the plurality of petals, the covering skin being at least partially located within the inner cylindrical volume in the stowed configuration.

9. The space-based occulter of claim 1, wherein the occulter, when in the stowed configuration, measures no more than 5 meters in diameter across in the radial direction.

10. The space-based occulter of claim 1, wherein the occulter, when in the deployed configuration, measures at least 60 meters in diameter across in the radial direction.

11. The space-based occulter of claim 1, including a plurality of flexible tension links, each tension link extending radially from the base hub, extending radially across the circular central portion, and being attached to at least one hypergaussian edge panel to exert tension between at least one petal and the base hub.

12. The space-based occulter of claim 1, wherein each petal includes:
a petal axis located in a lateral center of the petal such that the hypergaussian edge of the petal is substantially laterally symmetrical about the petal axis,
a plurality of hinges, each hinge being located radially between two adjacent hypergaussian edge panels, and
a plurality of accordion fold lines, each accordion fold line being defined by two laterally spaced hinges, the hinges being operative to allow pivotal movement between two adjacent hypergaussian edge panels about the accordion fold line; and
wherein, during movement of each petal from the deployed to the stowed configurations, the petal is accordion-folded about the plurality of accordion fold lines to radially collapse the petal directly inward toward the center axis and the petal is longitudinally folded about the petal axis to laterally collapse the petal into at least a portion of a fin that reduces the total width of the petal in a lateral direction.

13. The space-based occulter of claim 12, wherein, during movement of each petal from the stowed to the deployed configurations, the petal is longitudinally unfolded about the petal axis to laterally expand the petal and disassemble each fin, and the petal is radially unfolded about the plurality of accordion fold lines to radially expand the petal directly outward from the center axis.

14. A space-based occulter, selectively movable between a stowed configuration and a deployed configuration, the occulter comprising:
a base hub having a longitudinally oriented center axis;
a plurality of petals, each petal extending radially outward from, and spaced radially apart from, the base hub when in the deployed configuration, each petal including:
a petal edge made up of a plurality of edge panels, each edge panel defining a portion of the petal edge,
a petal axis located in a lateral center of the petal such that the petal edge is substantially laterally symmetrical about the petal axis,
a plurality of hinges, each hinge being located radially between two adjacent edge panels, and
a plurality of accordion fold lines, each accordion fold line being defined by two laterally spaced hinges, the hinges being operative to allow pivotal movement between two adjacent edge panels about the accordion fold line;

a circular central portion located radially between the base hub and the plurality of petals; and a covering skin extending laterally between the petal edges and over the circular central portion, the covering skin defining a substantially planar surface oriented substantially perpendicular to the center axis when the occulter is in the deployed configuration;

wherein, during movement of each petal from the deployed to the stowed configurations, the petal is accordion-folded about the plurality of accordion fold lines to radially collapse the petal directly inward toward the center axis and the petal is longitudinally folded about the petal axis to laterally collapse the petal into at least a portion of a fin that reduces the total width of the panel in a lateral direction.

15. The space-based occulter of claim 14, wherein the covering skin is a multi-layer insulated blanket.

16. The space-based occulter of claim 14, wherein the occulter further comprises a plurality of telescoping booms having spaced-apart first and second ends, each telescoping boom being associated with a corresponding one of the plurality of petals, and wherein each petal further comprises a tip fitting defining a distalmost portion of the petal edge relative to the base hub when the space-based occulter is in the deployed configuration, the first end of the telescoping boom being attached to the base hub for pivotal movement in a plane parallel to the center axis, and the second end of the telescoping boom being attached to the tip fitting, wherein telescopic expansion of the telescoping boom moves the tip fitting apart from the base hub as the occulter is moving from the stowed configuration to the deployed configuration.

17. The space-based occulter of claim 16, wherein each telescoping boom is oriented substantially parallel to the center axis when the occulter is in the stowed configuration and the second end of each telescoping boom pivots downward and radially outward in the plane parallel to the center axis as the occulter is moving from the stowed configuration to the deployed configuration.

18. The space-based occulter of claim 16, wherein each telescoping boom is oriented substantially perpendicular to the center axis and expands radially outward from the center axis to provide motive force to deploy an associated petal from a stowed configuration.

19. The space-based occulter of claim 18, wherein the edge panels and tip fitting of the petal are hingedly connected together to facilitate accordion-type folding of the petal in the stowed configuration, the telescoping boom providing motive force to unfold the petal from the accordion-type folded arrangement into the deployed configuration.

20. The space-based occulter of claim 14, including a launch lock caging system having a plurality of deployable truss segments pivotally attached to the base hub and positioned on a side of the stowed occulter opposite the center axis, each truss segment is configured to help maintain the occulter in the stowed configuration when oriented parallel to the center axis, and each truss segment is configured to pivot radially downward from the center axis to release the occulter for movement to the deployed configuration.

21. The space-based occulter of claim 14, wherein, when the occulter is in the stowed configuration, the plurality of petals are oriented substantially parallel to, and spaced radially apart from, the center axis to define an inner cylindrical volume located radially between the plurality of petals, the covering skin being at least partially located within the inner cylindrical volume in the stowed configuration.

22. The space-based occulter of claim 14, wherein the occulter, when in the stowed configuration, measures no more than 5 meters in diameter across in the radial direction.

23. The space-based occulter of claim 14, wherein the occulter, when in the deployed configuration, measures at least 60 meters in diameter across in the radial direction.

24. The space-based occulter of claim 14, including a plurality of flexible tension links, each tension link extending radially from the base hub, extending radially across the circular central portion, and being attached to at least one edge panel to exert tension between at least one petal and the base hub.

25. The space-based occulter of claim 14, wherein each edge panel is made substantially of a material having a near zero coefficient of thermal expansion.

26. The space-based occulter of claim 14, wherein each petal edge is a hypergaussian petal edge and each edge panel is a hypergaussian edge panel.

27. The space-based occulter of claim 14, wherein, during movement of each petal from the stowed to the deployed configurations, the petal is longitudinally unfolded about the petal axis to laterally expand the petal and disassemble each fin, and the petal is radially unfolded about the plurality of accordion fold lines to radially expand the petal directly outward from the center axis.

28. A space-based occulter, comprising:

a base hub defining a longitudinally oriented center axis;

a plurality of petals, each petal extending radially outward from, and spaced radially apart from, the base hub when in the deployed configuration, each petal having a hypergaussian edge made up of a plurality of hypergaussian edge panels and a tip fitting, each hypergaussian edge panel defining a portion of the hypergaussian edge of the petal;

a plurality of flexible tension links extending radially between at least one hypergaussian edge and the base hub, each tension link being configured to exert a tensile force between at least one petal and the base hub;

a plurality of telescoping booms, each telescoping boom extending between a tip fitting and the base hub, each telescoping boom being pivotally attached to the base hub for selective movement between radial and longitudinal orientations with respect to the base hub, each telescoping boom being configured to selectively provide motive force oriented in the radial direction to facilitate at least one of reduction and expansion of each petal in cooperation with the hinged attachment of the hypergaussian edge panels, and each telescoping boom being configured to resist the tensile force exerted on a respective petal by the tension link;

a circular central portion located radially between the base hub and at least one petal; and a covering skin extending laterally between the hypergaussian edges of each petal and over the circular central portion, the covering skin defining a substantially planar surface oriented perpendicular to the center axis.

29. The space-based occulter of claim 28, wherein the covering skin is a multi-layer insulated blanket.

30. The space-based occulter of claim 28, including a plurality of joints, each joint located between two adjacent petals, the joints facilitating relative pivoting of at least a portion of the hypergaussian edge of a first petal with respect to at least a portion of the hypergaussian edge of a second petal.

31. The space-based occulter of claim 28, wherein each telescoping boom has spaced-apart first and second ends, the first end of the telescoping boom being attached to the base hub for pivotal movement in a plane parallel to the center axis, and the second end of the telescoping boom being attached to the tip fitting, wherein telescopic expansion and contraction of the telescoping boom moves the tip fitting apart from and closer to the base hub, respectively.

32. The space-based occulter of claim 31, wherein each of the hypergaussian edge panels is hingedly attached to at least one of another hypergaussian edge panel and the tip fitting, the hinged attachment of the hypergaussian edge panels facilitating accordion folding of each petal to selectively reduce the length of each petal in the radial direction.

33. The space-based occulter of claim 32, wherein the accordion folding of each petal, the motive force oriented in the radial direction provided by the telescoping booms to facilitate at least one of reduction and expansion of each petal in cooperation with the hinged attachment of the hypergaussian edge panels, and the pivotal attachment of each telescoping boom to the base hub for selective movement between radial and longitudinal orientations with respect to the base hub cooperatively facilitate movement of the space-based occulter between stowed and deployed configurations, wherein:
the space-based occulter, when in the stowed configuration, is configured to compact the petals, covering skin, and base hub into a longitudinally oriented, substantially cylindrical bundle; and
the space-based occulter, when in the deployed configuration, is configured to expand the petals, covering skin, and base hub into a substantially planar structure extending radially outward from, and substantially perpendicular to, the center axis.

34. The space-based occulter of claim 33, including a launch lock caging system having a plurality of deployable truss segments pivotally attached to the base hub, each truss segment configured to help maintain the occulter in the stowed configuration when oriented parallel to the center axis, and each truss segment configured to pivot radially downward from the center axis to release the occulter for movement to the deployed configuration.

35. The space-based occulter of claim 33, wherein, when the occulter is in the stowed configuration, the plurality of petals are oriented substantially parallel to, and spaced radially apart from, the center axis to define an inner cylindrical volume located radially between the plurality of petals, the covering skin being at least partially located within the inner cylindrical volume in the stowed configuration.

36. The space-based occulter of claim 28, wherein the occulter, when in the stowed configuration, measures no more than 5 meters in diameter across in the radial direction.

37. The space-based occulter of claim 28, wherein the occulter, when in the deployed configuration, measures at least 60 meters in diameter across in the radial direction.

38. The space-based occulter of claim 28, wherein each hypergaussian edge panel is made substantially of a material having a near zero coefficient of thermal expansion.

39. The space-based occulter of claim 28, wherein each petal includes:
a petal axis located in a lateral center of the petal such that the hypergaussian edge of the petal is substantially laterally symmetrical about the petal axis,
a plurality of hinges, each hinge being located radially between two adjacent hypergaussian edge panels, and
a plurality of accordion fold lines, each accordion fold line being defined by two laterally spaced hinges, the hinges being operative to allow pivotal movement between two adjacent hypergaussian edge panels about the accordion fold line; and
wherein, during movement of each petal from the deployed to the stowed configurations, the petal is accordion-folded about the plurality of accordion fold lines to radially collapse the petal directly inward toward the center axis and the petal is longitudinally folded about the petal axis to laterally collapse the petal into at least a portion of a fin that reduces the total width of the petal in a lateral direction.

40. The space-based occulter of claim 39, wherein, during movement of each petal from the stowed to the deployed configurations, the petal is longitudinally unfolded about the petal axis to laterally expand the petal and disassemble each fin, and the petal is radially unfolded about the plurality of accordion fold lines to radially expand the petal directly outward from the center axis.

* * * * *

UNITED STATES PATENT AND TRADEMARK OFFICE
CERTIFICATE OF CORRECTION

| | | |
|---|---|---|
| PATENT NO. | : 8,167,247 B2 | Page 1 of 1 |
| APPLICATION NO. | : 12/754293 | |
| DATED | : May 1, 2012 | |
| INVENTOR(S) | : Dean R. Dailey, David J. Rohweller and Tiffany Glassman | |

It is certified that error appears in the above-identified patent and that said Letters Patent is hereby corrected as shown below:

Cover page, item (75) Inventors: delete "Dean R. Daily," and insert --Dean R. Dailey,--.

Signed and Sealed this
Tenth Day of July, 2012

David J. Kappos
*Director of the United States Patent and Trademark Office*